(12) United States Patent
Kim et al.

(10) Patent No.: US 12,114,270 B2
(45) Date of Patent: *Oct. 8, 2024

(54) METHODS AND APPARATUS FOR USER EQUIPMENT TO DIFFERENTIATE HUMAN GRIP FROM PROTECTIVE COVERS

(71) Applicant: QUALCOMM Incorporated, San Diego, CA (US)

(72) Inventors: Seunghwan Kim, San Diego, CA (US); Udara Fernando, San Diego, CA (US); Eyosias Yoseph Imana, Chula Vista, CA (US); Robert Gilmore, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/654,904

(22) Filed: Mar. 15, 2022

(65) Prior Publication Data

US 2022/0210746 A1 Jun. 30, 2022

Related U.S. Application Data

(63) Continuation of application No. 16/898,746, filed on Jun. 11, 2020, now Pat. No. 11,310,747.

(Continued)

(51) Int. Cl.
*H04W 52/24* (2009.01)
*H04B 3/52* (2006.01)
(Continued)

(52) U.S. Cl.
CPC ............ *H04W 52/146* (2013.01); *H04B 3/52* (2013.01); *H04B 7/10* (2013.01); *H04W 52/241* (2013.01);
(Continued)

(58) Field of Classification Search
CPC ............ H04W 52/146; H04W 52/241; H04W 52/242; H04W 52/325; H04W 52/367; H04B 3/52; H04B 7/10
See application file for complete search history.

(56) References Cited

U.S. PATENT DOCUMENTS 8,306,473 B2  11/2012  Anreddy et al.
9,762,710 B2   9/2017  Lee et al.
(Continued)

FOREIGN PATENT DOCUMENTS

CN  107370523 A  11/2017
CN  107636893 A   1/2018
(Continued)

OTHER PUBLICATIONS

International Search Report and Written Opinion—PCT/US2020/037543—ISA/EPO—dated Apr. 12, 2021.

*Primary Examiner* — John J Lee
(74) *Attorney, Agent, or Firm* — Patterson & Sheridan LLP/Qualcomm Incorporated

(57) ABSTRACT

Methods and apparatus for distinguishing between an antenna of a user equipment (UE) being blocked by a cover (e.g., a protective rubber or plastic case) or by human tissue (e.g., a finger or palm). The transmission power of uplink (UL) signals may be adjusted accordingly, with relatively higher transmission power for open space or a cover and relatively lower transmission power for human tissue. One example method for wireless communications by a UE generally includes transmitting a first signal from the UE, receiving a plurality of signals at the UE based on the transmitted first signal, determining values for at least two different types of parameters based on the received plurality of signals, determining an environmental scenario for the UE based on the values for the at least two different types of (Continued)

parameters, and transmitting a second signal using a transmission power based on the determined environmental scenario.

20 Claims, 13 Drawing Sheets

Related U.S. Application Data

(60) Provisional application No. 62/860,608, filed on Jun. 12, 2019.

(51) Int. Cl.
*H04B 7/10* (2017.01)
*H04W 52/14* (2009.01)
*H04W 52/32* (2009.01)
*H04W 52/36* (2009.01)

(52) U.S. Cl.
CPC ....... *H04W 52/242* (2013.01); *H04W 52/325* (2013.01); *H04W 52/367* (2013.01)

(56) References Cited

U.S. PATENT DOCUMENTS

| | | | |
|---|---|---|---|
| 9,813,532 | B2 | 11/2017 | Kim et al. |
| 9,872,296 | B2 | 1/2018 | Raghavan et al. |
| 9,929,763 | B1 | 3/2018 | Zheng et al. |
| 10,015,294 | B2 | 7/2018 | Lee et al. |
| 10,020,577 | B2 | 7/2018 | Sanderovich et al. |
| 10,224,608 | B2 | 3/2019 | Lee et al. |
| 10,468,752 | B2 | 11/2019 | Jung et al. |
| 10,516,772 | B2 | 12/2019 | Lee et al. |
| 10,707,912 | B2 * | 7/2020 | Kim .................. H04M 1/0254 |
| 10,819,010 | B2 | 10/2020 | Lee et al. |
| 11,050,863 | B2 | 6/2021 | Lee et al. |
| 2007/0072014 | A1 * | 3/2007 | Kim .......................... H04B 5/02 429/7 |
| 2009/0298424 | A1 | 12/2009 | Liu et al. |
| 2012/0106595 | A1 | 5/2012 | Bhattad et al. |
| 2014/0187281 | A1 | 7/2014 | Faraone et al. |
| 2014/0252786 | A1 | 9/2014 | Singhal |
| 2014/0315592 | A1 | 10/2014 | Schlub et al. |
| 2016/0327634 | A1 | 11/2016 | Katz et al. |
| 2016/0365886 | A1 | 12/2016 | Prendergast et al. |
| 2017/0290011 | A1 | 10/2017 | Kushnir et al. |
| 2017/0358838 | A1 | 12/2017 | Huang et al. |
| 2018/0041261 | A1 | 2/2018 | Modarres Razavi et al. |
| 2018/0287651 | A1 | 10/2018 | Fernando et al. |
| 2020/0195310 | A1 | 6/2020 | Abedini et al. |
| 2020/0358512 | A1 | 11/2020 | Zhan et al. |
| 2020/0396693 | A1 | 12/2020 | Kim et al. |
| 2021/0044336 | A1 | 2/2021 | Lee et al. |
| 2021/0242919 | A1 | 8/2021 | Park et al. |
| 2021/0274027 | A1 | 9/2021 | Lee et al. |
| 2021/0282097 | A1 | 9/2021 | Imana et al. |

FOREIGN PATENT DOCUMENTS

| | | | |
|---|---|---|---|
| CN | 108700622 A | 10/2018 | |
| CN | 109547047 A | 3/2019 | |
| WO | WO-2007088642 A1 * | 8/2007 | ........... G06F 3/0238 |
| WO | 2009102954 A2 | 8/2009 | |
| WO | 2011140262 A1 | 11/2011 | |
| WO | 2015108237 A1 | 7/2015 | |
| WO | 2016085577 A1 | 6/2016 | |
| WO | 2016178786 A1 | 11/2016 | |
| WO | WO-2018054028 A1 * | 3/2018 | ............. H02J 50/10 |
| WO | 2019126220 A1 | 6/2019 | |
| WO | 2021026390 A1 | 2/2021 | |

\* cited by examiner

METHODS AND APPARATUS FOR USER EQUIPMENT TO DIFFERENTIATE HUMAN GRIP FROM PROTECTIVE COVERS

CLAIM OF PRIORITY UNDER 35 U.S.C. §§ 119 AND 120

This application is a continuation application of U.S. application Ser. No. 16/898,746, entitled "Methods and Apparatus for User Equipment to Differentiate Human Grip from Protective Covers" filed Jun. 11, 2020, which claims benefit of and priority to U.S. Provisional Patent Application No. 62/860,608, entitled "Methods and Apparatus for User Equipment to Differentiate Human Grip from Protective Covers" and filed Jun. 12, 2019, each of which is expressly incorporated herein in its entirety.

TECHNICAL FIELD

Certain aspects of the present disclosure generally relate to wireless devices and, more particularly, to differentiating between human grip and a protective cover on a wireless device.

BACKGROUND

Modern wireless devices (such as cellular phones) are generally required to meet radio frequency (RF) exposure limits set by domestic and international standards and regulations. To ensure compliance with the standards, such devices must currently undergo an extensive certification process prior to being shipped to market. To ensure that a wireless device complies with an RF exposure limit, techniques have been developed to enable the wireless device to assess RF exposure from the wireless device in real time and adjust the transmission power of the wireless device accordingly to comply with the RF exposure limit.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include improved systems and methods for assessing RF exposure from a wireless device.

Certain aspects of the present disclosure provide a method for wireless communications by a user equipment (UE). The method generally includes transmitting a first signal from the UE, receiving a plurality of signals at the UE based on the transmitted first signal, determining values for at least two different types of parameters based on the received plurality of signals, determining an environmental scenario for the UE based on the values for the at least two different types of parameters, and transmitting a second signal using a transmission power based on the determined environmental scenario.

Certain aspects of the present disclosure are directed to an apparatus for wireless communications. The apparatus includes a transmitter, a receiver, and a processing system. The transmitter is configured to transmit a first signal from the apparatus, and the receiver is configured to receive a plurality of signals based on the transmitted first signal. The processing system is configured to determine values for at least two different types of parameters based on the received plurality of signals and to determine an environmental scenario for the apparatus based on the values for the at least two different types of parameters. The transmitter is further configured to transmit a second signal using a transmission power based on the determined environmental scenario.

Certain aspects of the present disclosure are directed to an apparatus for wireless communications. The apparatus generally includes means for transmitting a first signal, means for receiving a plurality of signals based on the transmitted first signal, means for determining values for at least two different types of parameters based on the received plurality of signals, means for determining an environmental scenario for the apparatus based on the values for the at least two different types of parameters, and means for transmitting a second signal using a transmission power based on the determined environmental scenario.

Certain aspects of the present disclosure are directed to a non-transitory computer-readable medium having instructions, which when executed by a processing system, cause the processing system to perform operations for wireless communications by a UE. The operations generally include controlling transmission of a first signal from the UE, controlling reception of a plurality of signals based on the transmitted first signal, determining values for at least two different types of parameters based on the received plurality of signals, determining an environmental scenario for the UE based on the values for the at least two different types of parameters, and controlling transmission of a second signal using a transmission power based on the determined environmental scenario.

Certain aspects of the present disclosure provide a method for wireless communications by a UE. The method generally includes transmitting a first signal from the UE; receiving a plurality of signals at the UE based on the transmitted first signal; determining a value for each of one or more parameters based on the received plurality of signals; determining a type of a cover adjacent to an antenna array of the UE based on the value for each of the one or more parameters; selecting an antenna array codebook based on the determined type of the cover; and transmitting a second signal according to the selected antenna array codebook.

Certain aspects of the present disclosure are directed to an apparatus for wireless communications. The apparatus includes an antenna array, a transmitter, a receiver, and a processing system. The transmitter is coupled to the antenna array and configured to transmit a first signal via the antenna array. The receiver is coupled to the antenna array and configured to receive, via the antenna array, a plurality of signals based on the transmitted first signal. The processing system is coupled to the receiver and configured to determine a value for each of one or more parameters based on the received plurality of signals, to determine a type of a cover adjacent to the antenna array of the apparatus based on the value for each of the one or more parameters, and to select an antenna array codebook based on the determined type of the cover. The transmitter is further configured to transmit, via the antenna array, a second signal according to the selected antenna array codebook.

Certain aspects of the present disclosure are directed to an apparatus for wireless communications. The apparatus generally includes means for transmitting a first signal from the apparatus; means for receiving a plurality of signals based on the transmitted first signal; means for determining a value for each of one or more parameters based on the received plurality of signals; means for determining a type of a cover adjacent to an antenna array of the apparatus based on the value for each of the one or more parameters; means for selecting an antenna array codebook based on the determined type of the cover; and means for transmitting a second signal according to the selected antenna array codebook.

Certain aspects of the present disclosure are directed to a non-transitory computer-readable medium having instructions, which when executed by a processing system, cause the processing system to perform operations for wireless communications by a UE. The operations generally include controlling transmission of a first signal from the UE; controlling reception of a plurality of signals based on the transmitted first signal; determining a value for each of one or more parameters based on the received plurality of signals; determining a type of a cover adjacent to an antenna array of the UE based on the value for each of the one or more parameters; selecting an antenna array codebook based on the determined type of the cover; and controlling transmission of a second signal according to the selected antenna array codebook.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Like reference numbers and designations in the various drawings indicate like elements.

DETAILED DESCRIPTION

Figure 1:
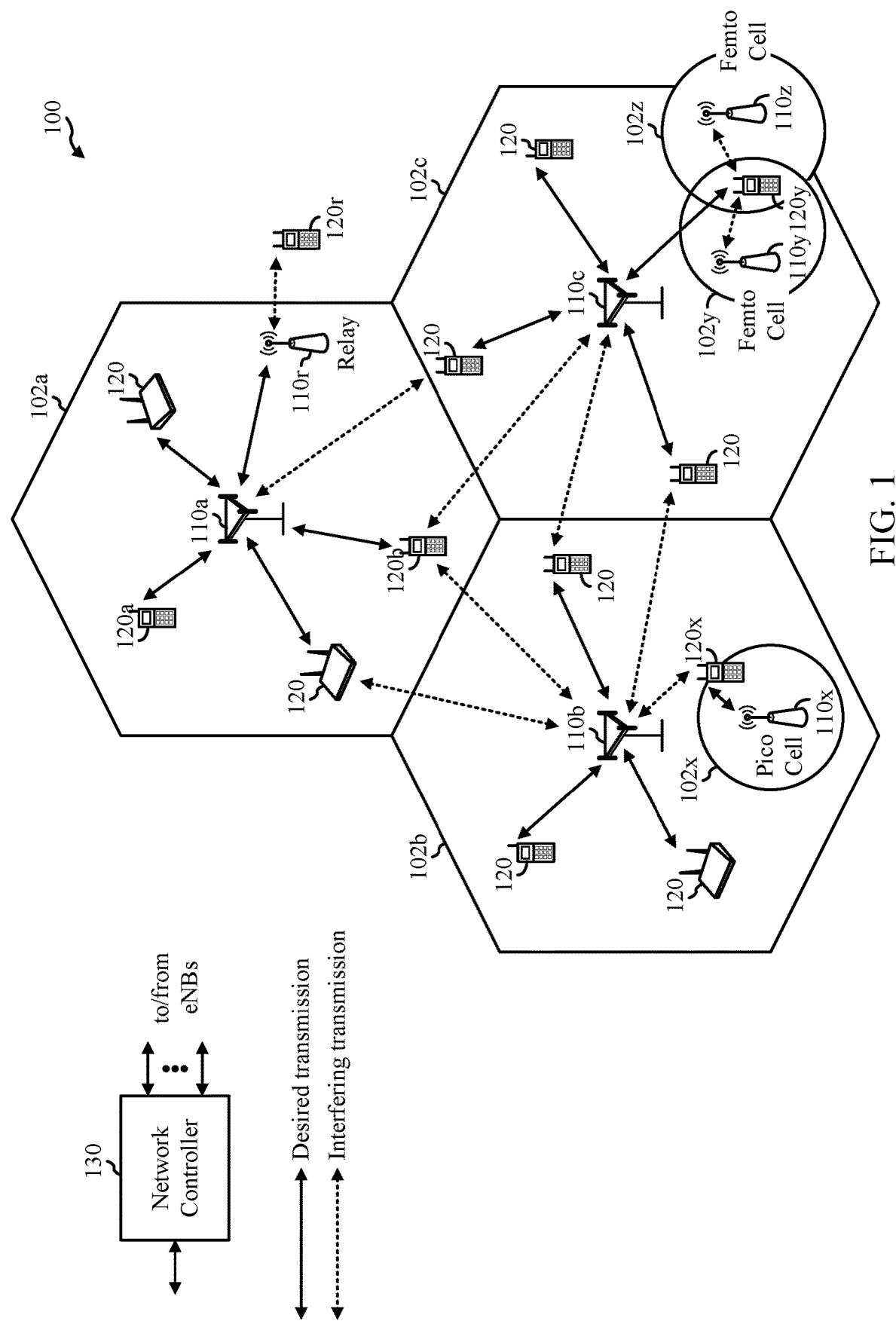
FIG. 1 is a block diagram conceptually illustrating an example telecommunications system, in accordance with certain aspects of the present disclosure.

Certain aspects of the present disclosure provide techniques and apparatus for distinguishing between an antenna of a user equipment (UE) being blocked by a cover (e.g., a protective rubber or plastic cover) or by human tissue (e.g., a finger or palm). The transmission power of uplink (UL) signals may be adjusted accordingly, with relatively higher transmission power for open space or a cover and relatively lower transmission power for human tissue.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communications network 100 in which aspects of the present disclosure may be performed. Wireless devices in the wireless network 100 may perform the methods for determining an environmental scenario for an antenna (or antenna array) of the wireless device as further described herein. As used herein, an "environmental scenario" generally refers to the antenna (or antenna array) of the wireless device being blocked by an object (such as a protective cover or human grip) or not being blocked by an object (a condition referred to as "open space").

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation Node B (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 watts (W)) whereas a pico BS, a femto BS, and relays may have a lower transmit power level (e.g., 1 W).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station (MS), a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a Global Positioning System (GPS) device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz, and the minimum resource allocation (called a "resource block" (RB)) may be 12 subcarriers (or 180 kHz). Consequently, the nominal fast Fourier transform (FFT) size may be equal to 128, 256, 512, 1024, or 2048 for a system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for a system bandwidth of 1.25, 2.5, 5, 10, or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using time-division duplexing (TDD). Beamforming may be supported, and beam direction may be dynamically configured. Multiple-input, multiple-output (MIMO) transmissions with precoding may also be supported. MIMO configurations in the downlink (DL) may support up to 8 transmit antennas with multi-layer DL transmissions up to 8 streams and up to 2 streams per UE. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Figure 2:
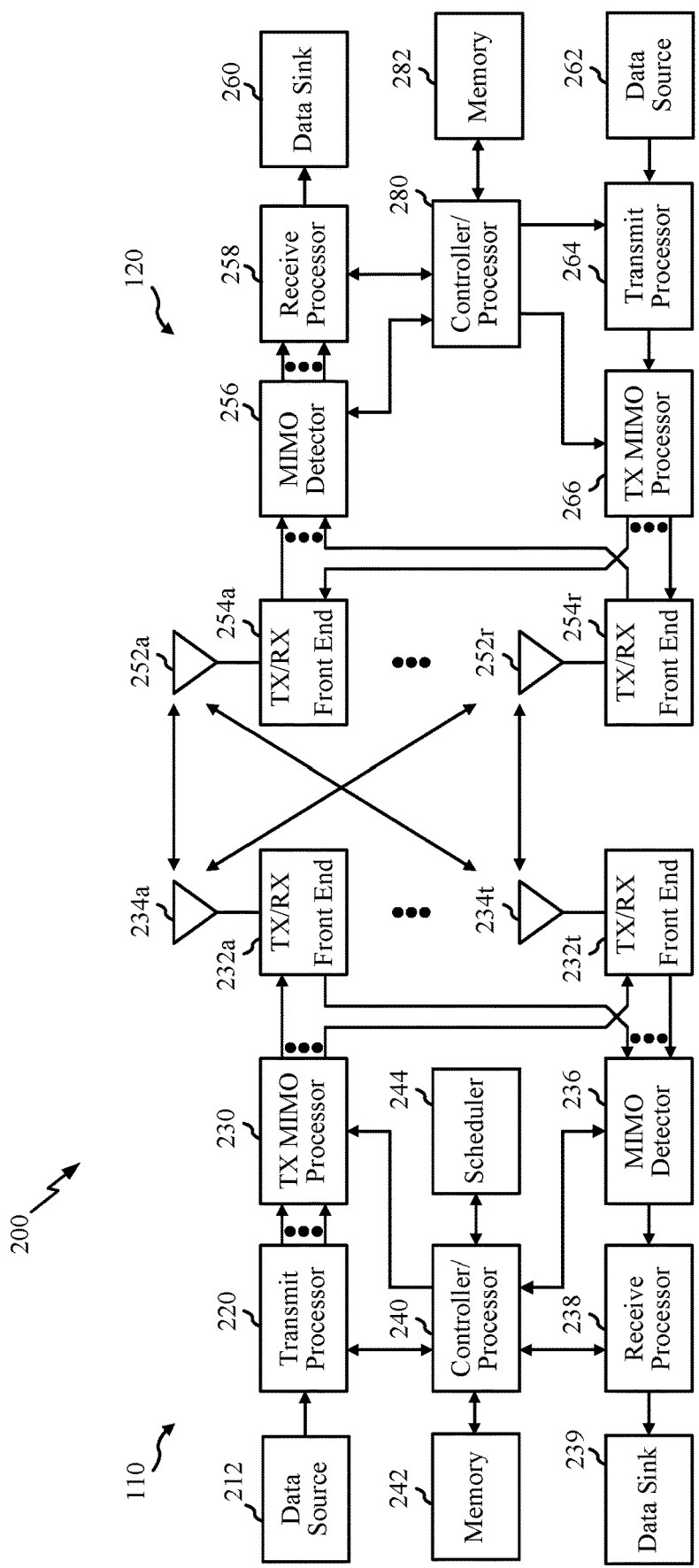
FIG. 2 is a block diagram conceptually illustrating a design of an example base station (BS) and an example user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, transceiver (TX/RX) front-end circuits 254, processors 258, 264, and/or controller/processor 280 of the UE 120 may be used to perform the various techniques and methods described herein (e.g., operations 700 of FIG. 7 or operations 1200 of FIG. 12).

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the transmit (TX) front-end circuits 232a through 232t. Each TX front-end circuit 232 may process a respective output symbol stream (e.g., for OFDM, etc.) to obtain an output sample stream. Each TX front-end circuit 232 may further process (e.g., convert to analog, amplify, filter, and upconvert) the output sample stream to obtain a downlink signal. Downlink signals from TX front-end circuits 232a through 232t may be transmitted via the antennas 234a through 234t, respectively.

At the UE 120, the antennas 252a through 252r may receive the downlink signals from the BS 110 and may provide received signals to the receive (RX) front-end circuits 254a through 254r, respectively. Each RX front-end circuit 254 may condition (e.g., filter, amplify, downconvert, and digitize) a respective received signal to obtain input samples. Each RX front-end circuit 254 may further process the input samples (e.g., for OFDM, etc.) to obtain received symbols. A MIMO detector 256 may obtain received symbols from all the RX front-end circuits 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280. Memory 282 may store data and program codes for the UE 120 and may interface with the controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the RX front-end circuits 254a through 254r (e.g., for SC-FDM, etc.), and transmitted to the BS 110. At the BS 110, the uplink signals from the UE 120 may be received by the antennas 234, processed by the TX front-end circuits 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240. Memory 242 may store data and program codes for the BS 110 and may interface with the controller/processor 240.

The controllers/processors 240 and 280 may direct the operation at the BS 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
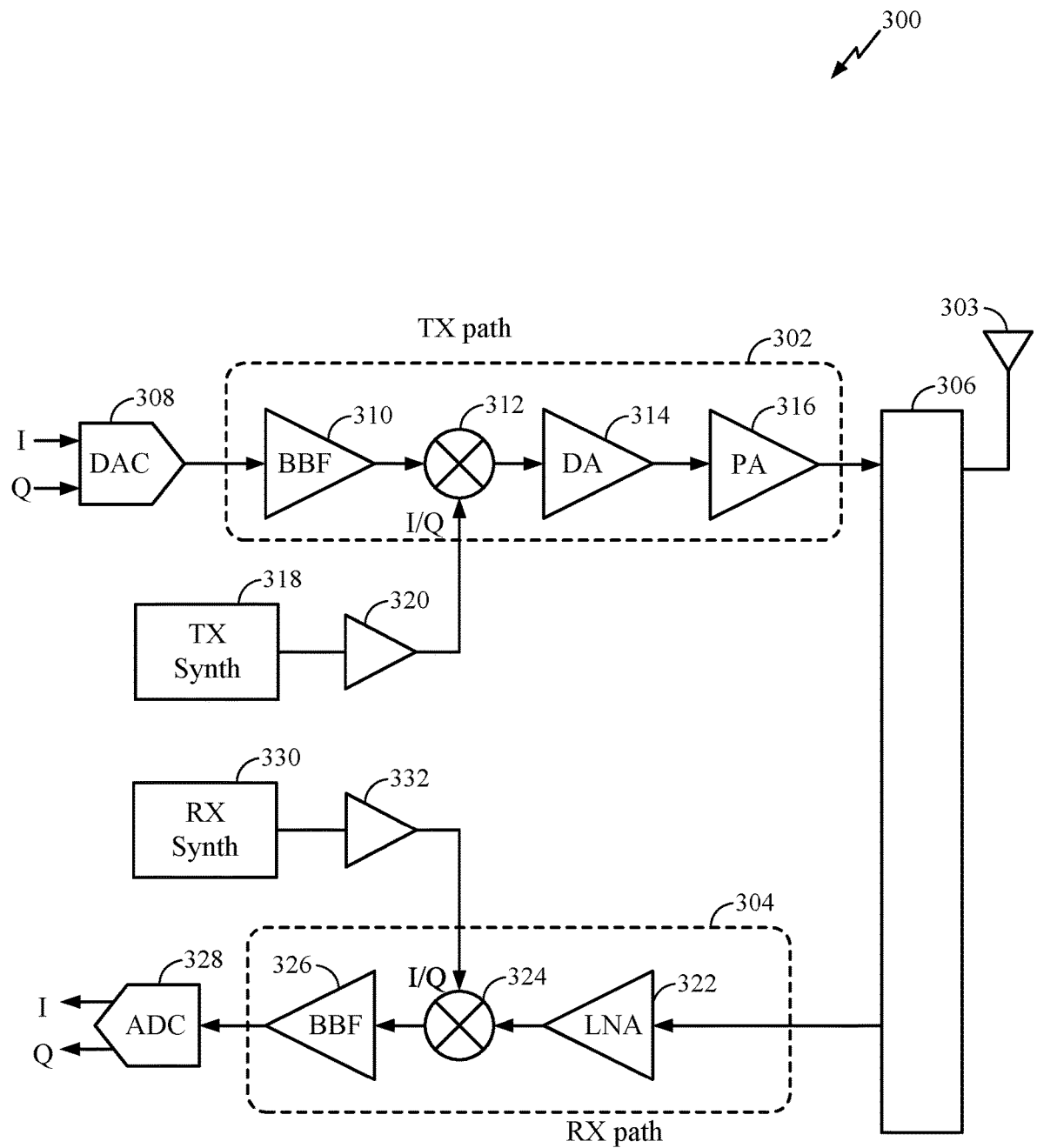
FIG. 3 is a block diagram showing an example transceiver front-end, in accordance with certain aspects of the present disclosure.

FIG. 3 is a block diagram of an example transceiver front-end 300, such as TX/RX front-end circuits 232, 254 in FIG. 2, in accordance with certain aspects of the present disclosure. The transceiver front-end 300 includes at least one transmit (TX) path 302 (also known as a "transmit chain") for transmitting signals via one or more antennas and at least one receive (RX) path 304 (also known as a "receive chain") for receiving signals via the antennas. When the TX path 302 and the RX path 304 share an antenna 303, the paths may be connected with the antenna via an RF interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be included in the RFIC or external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303.

The RX path 304 may include a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies may indicate using a variable-frequency oscillator, which can involve compromises between stability and tunability. Contemporary systems may employ frequency synthesizers with a voltage-controlled oscillator (VCO) to generate a stable, tunable LO with a particular tuning range. Thus, the transmit LO may be produced by a TX frequency synthesizer 318, which may be buffered or amplified by amplifier 320 before being mixed with the baseband signals in the mixer 312. Similarly, the receive LO may be produced by an RX frequency synthesizer 330, which may be buffered or amplified by amplifier 332 before being mixed with the RF signals in the mixer 324.

Example RF Exposure Assessment

RF exposure may be expressed in terms of a specific absorption rate (SAR), which measures energy absorption by human tissue per unit mass and may have units of watts per kilogram (W/kg). Alternatively, RF exposure may be expressed in terms of power density (PD), which measures energy absorption per unit area and may have units of mW/cm$^2$.

SAR may be used to assess RF exposure for transmission frequencies less than 6 GHz, which cover wireless communication technologies such as 3G (e.g., CDMA), 4G (e.g., LTE), 5G (e.g., NR in 6 GHz bands), IEEE 802.11 ac, etc. PD may be used to assess RF exposure for transmission frequencies higher than 10 GHz, which cover wireless communication technologies such as IEEE 802.11ad, 802.11ay, 5G, etc. Thus, different metrics may be used to assess RF exposure for different wireless communication technologies.

A wireless device (e.g., UE 120) may simultaneously transmit signals using multiple wireless communication technologies. For example, the wireless device may simultaneously transmit signals using a first wireless communication technology operating at or below 6 GHz (e.g., 3G, 4G, 5G, etc.) and a second wireless communication technology operating above 6 GHz (e.g., 5G in 24 to 60 GHz bands, IEEE 802.11ad or 802.11ay). In certain aspects, the wireless device may simultaneously transmit signals using the first wireless communication technology (e.g., 3G, 4G, 5G in 6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD.

To assess RF exposure from transmissions using the first technology (e.g., 3G, 4G, 5G in 6 GHz bands, IEEE 802.11ac, etc.), the wireless device may include multiple SAR distributions for the first technology stored in memory (e.g., memory 282 of FIG. 2 or memory 336 of FIG. 3). Each of the SAR distributions may correspond to a respective one of multiple transmit scenarios supported by the wireless device for the first technology. The transmit scenarios may correspond to various combinations of antennas (e.g., antennas 252a through 252r of FIG. 2 or antenna 303 of FIG. 3), frequency bands, channels, and/or body positions, as discussed further below.

The SAR distribution (also referred to as a "SAR map") for each transmit scenario may be generated based on measurements (e.g., E-field measurements) performed in a test laboratory using a model of a human body. After the SAR distributions are generated, the SAR distributions may be stored in the memory to enable a processor (e.g., processor 266 of FIG. 2) to assess RF exposure in real time. Each SAR distribution includes a set of SAR values, where each SAR value may correspond to a different location (e.g., on the model of the human body). Each SAR value may comprise a SAR value averaged over a mass of 1 g or 10 g at the respective location.

The SAR values in each SAR distribution correspond to a particular transmission power level (e.g., the transmission power level at which the SAR values were measured in the test laboratory). Since SAR scales with transmission power level, the processor may scale a SAR distribution for any transmission power level by multiplying each SAR value in the SAR distribution by the following transmission power scaler:

$$\frac{Tx_c}{Tx_{SAR}} \quad (1)$$

where $Tx_c$ is a current transmission power level for the respective transmit scenario, and $Tx_{SAR}$ is the transmission power level corresponding to the SAR values in the stored SAR distribution (e.g., the transmission power level at which the SAR values were measured in the test laboratory).

As discussed above, the wireless device may support multiple transmit scenarios for the first technology. In certain aspects, the transmit scenarios may be specified by a set of parameters. The set of parameters may include one or more of the following: (a) an antenna parameter indicating one or more antennas used for transmission (i.e., active antennas), (b) a frequency band parameter indicating one or more frequency bands used for transmission (i.e., active frequency bands), (c) a channel parameter indicating one or more channels used for transmission (i.e., active channels), (d) a body position parameter indicating the location of the wireless device relative to the user's body location (head, trunk, away from the body, etc.), and/or (e) other parameters. In cases where the wireless device supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios, as discussed further below.

For example, SAR measurements may be performed for each one of the antennas to generate a SAR distribution for each one of the antennas. In this example, a SAR distribution for a transmit scenario in which two or more of the antennas are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmit scenario in which two or more frequency bands are active may be generated by combining the SAR distributions for the two or more active frequency bands.

In certain aspects, a SAR distribution may be normalized with respect to a SAR limit by dividing each SAR value in the SAR distribution by the SAR limit. In this case, a normalized SAR value exceeds the SAR limit when the normalized SAR value is greater than one, and is below the SAR limit when the normalized SAR value is less than one. In these aspects, each of the SAR distributions stored in the memory may be normalized with respect to a SAR limit.

In certain aspects, the normalized SAR distribution for a transmit scenario may be generated by combining two or more normalized SAR distributions. For example, a normalized SAR distribution for a transmit scenario in which two or more antennas are active may be generated by combining the normalized SAR distributions for the two or more active antennas. For the case in which different transmission power levels are used for the active antennas, the normalized SAR distribution for each active antenna may be scaled by the respective transmission power level before combining the normalized SAR distributions for the active antennas. The normalized SAR distribution for simultaneous transmission from multiple active antennas may be given by the following:

$$SAR_{norm\_combined} = \sum_{i=1}^{i=K} \frac{Tx_i}{Tx_{SARi}} \cdot \frac{SAR_i}{SAR_{lim}} \quad (2)$$

where $SAR_{lim}$ is a SAR limit, $SAR_{norm\_combined}$ is the combined normalized SAR distribution for simultaneous transmission from the active antennas, i is an index for the active antennas, $SAR_i$ is the SAR distribution for the $i^{th}$ active antenna, $Tx_i$ is the transmission power level for the $i^{th}$ active antenna, $Tx_{SARi}$ is the transmission power level for the SAR distribution for the $i^{th}$ active antenna, and K is the number of the active antennas.

Equation (2) may be rewritten as follows:

$$SAR_{norm\_combined} = \sum_{i=1}^{i=K} \frac{Tx_i}{Tx_{SARi}} \cdot SAR_{norm\_i} \quad (3a)$$

where $SAR_{norm\_i}$ is the normalized SAR distribution for the $i^{th}$ active antenna. In the case of simultaneous transmissions using multiple active antennas at the same transmitting frequency (e.g., multiple in multiple out (MIMO)), the combined normalized SAR distribution is obtained by summing the square root of the individual normalized SAR distributions and computing the square of the sum, as given by the following:

$$SAR_{norm\_combined\_MIMO} = \left[\sum_{k=1}^{i=K} \sqrt{\frac{Tx_i}{Tx_{SARi}} \cdot SAR_{norm\_i}}\right]^2. \quad (3b)$$

In another example, normalized SAR distributions for different frequency bands may be stored in the memory. In this example, a normalized SAR distribution for a transmit scenario in which two or more frequency bands are active may be generated by combining the normalized SAR distributions for the two or more active frequency bands. For the case where the transmission power levels are different for the active frequency bands, the normalized SAR distribution for each of the active frequency bands may be scaled by the respective transmission power level before combining the normalized SAR distributions for the active frequency bands. In this example, the combined SAR distribution may also be computed using Equation (3a) in which i is an index for the active frequency bands, $SAR_{norm\_i}$ is the normalized SAR distribution for the $i^{th}$ active frequency band, $Tx_i$ is the transmission power level for the $i^{th}$ active frequency band, and $Tx_{SARi}$ is the transmission power level for the normalized SAR distribution for the $i^{th}$ active frequency band.

To assess RF exposure from transmissions using the second technology (e.g., 5G in 24 to 60 GHz bands, IEEE 802.11ad, 802.11ay, etc.), the wireless device may include multiple PD distributions for the second technology stored in the memory (e.g., memory 282 of FIG. 2 or memory 336 of FIG. 3). Each of the PD distributions may correspond to a respective one of multiple transmit scenarios supported by the wireless device for the second technology. The transmit scenarios may correspond to various combinations of antennas (e.g., antennas 252a through 252r of FIG. 2 or antenna 303 of FIG. 3), frequency bands, channels, and/or body positions.

The PD distribution (also referred to as a "PD map") for each transmit scenario may be generated based on measurements (e.g., E-field measurements) performed in a test laboratory using a model of a human body. After the PD distributions are generated, the PD distributions may be stored in the memory to enable the processor (e.g., processor 266 of FIG. 2) to assess RF exposure in real time, as discussed further below. Each PD distribution includes a set of PD values, where each PD value may correspond to a different location (e.g., on the model of the human body).

The PD values in each PD distribution correspond to a particular transmission power level (e.g., the transmission power level at which the PD values were measured in the test laboratory). Since PD scales with transmission power level, the processor may scale a PD distribution for any transmission power level by multiplying each PD value in the PD distribution by the following transmission power scaler:

$$\frac{Tx_c}{Tx_{PD}} \quad (4)$$

where $Tx_c$ is a current transmission power level for the respective transmit scenario, and TxPD is the transmission power level corresponding to the PD values in the PD distribution (e.g., the transmission power level at which the PD values were measured in the test laboratory).

As discussed above, the wireless device may support multiple transmit scenarios for the second technology. In certain aspects, the transmit scenarios may be specified by a set of parameters. The set of parameters may include one or more of the following: (a) an antenna parameter indicating one or more antennas used for transmission (i.e., active antennas), (b) a frequency band parameter indicating one or more frequency bands used for transmission (i.e., active frequency bands), (c) a channel parameter indicating one or more channels used for transmission (i.e., active channels), (d) a body position parameter indicating the location of the wireless device relative to the user's body location (head, trunk, away from the body, etc.), and/or (e) other parameters. In cases where the wireless device supports a large number of transmit scenarios, it may be very time-consuming and expensive to perform measurements for each transmit scenario in a test setting (e.g., test laboratory). To reduce test time, measurements may be performed for a subset of the transmit scenarios to generate PD distributions for the subset of transmit scenarios. In this example, the PD distribution for each of the remaining transmit scenarios may be generated by combining two or more of the PD distributions for the subset of transmit scenarios, as discussed further below.

For example, PD measurements may be performed for each one of the antennas to generate a PD distribution for each one of the antennas. In this example, a PD distribution for a transmit scenario in which two or more of the antennas are active may be generated by combining the PD distributions for the two or more active antennas.

In another example, PD measurements may be performed for each one of multiple frequency bands to generate a PD distribution for each one of the multiple frequency bands. In this example, a PD distribution for a transmit scenario in which two or more frequency bands are active may be generated by combining the PD distributions for the two or more active frequency bands.

In certain aspects, a PD distribution may be normalized with respect to a PD limit by dividing each PD value in the PD distribution by the PD limit. In this case, a normalized PD value exceeds the PD limit when the normalized PD value is greater than one, and is below the PD limit when the normalized PD value is less than one. In these aspects, each of the PD distributions stored in the memory may be normalized with respect to a PD limit.

In certain aspects, the normalized PD distribution for a transmit scenario may be generated by combining two or more normalized PD distributions. For example, a normalized PD distribution for a transmit scenario in which two or more antennas are active may be generated by combining the normalized PD distributions for the two or more active antennas. For the case in which different transmission power levels are used for the active antennas, the normalized PD distribution for each active antenna may be scaled by the respective transmission power level before combining the normalized PD distributions for the active antennas. The normalized PD distribution for simultaneous transmission from multiple active antennas may be given by the following:

$$PD_{norm\_combined} = \sum_{k=1}^{i=L} \frac{Tx_i}{Tx_{PDi}} \cdot \frac{PD_i}{PD_{lim}} \quad (5)$$

where $PD_{lim}$ is a PD limit, $PD_{norm\_combined}$ is the combined normalized PD distribution for simultaneous transmission from the active antennas, i is an index for the active antennas, $PD_i$ is the PD distribution for the $i^{th}$ active antenna, $Tx_i$ is the transmission power level for the $i^{th}$ active antenna, $TX_{PDi}$ is the transmission power level for the PD distribution for the $i^{th}$ active antenna, and L is the number of the active antennas.

Equation (5) may be rewritten as follows:

$$PD_{norm\_combined} = \sum_{i=1}^{i=L} \frac{Tx_i}{Tx_{PDi}} \cdot PD_{norm\_i} \qquad (6a)$$

where $PD_{norm}$ is the normalized PD distribution for the $i^{th}$ active antenna. In the case of simultaneous transmissions using multiple active antennas at the same transmitting frequency (e.g., MIMO), the combined normalized PD distribution is obtained by summing the square root of the individual normalized PD distributions and computing the square of the sum, as given by the following:

$$PD_{norm\_combined\_MIMO} = \left[\sum_{i=1}^{i=L} \sqrt{\frac{Tx_i}{Tx_{PDi}} \cdot PD_{norm\_i}}\right]^2. \qquad (6b)$$

In another example, normalized PD distributions for different frequency bands may be stored in the memory. In this example, a normalized PD distribution for a transmit scenario in which two or more frequency bands are active may be generated by combining the normalized PD distributions for the two or more active frequency bands. For the case where the transmission power levels are different for the active frequency bands, the normalized PD distribution for each of the active frequency bands may be scaled by the respective transmission power level before combining the normalized PD distributions for the active frequency bands. In this example, the combined PD distribution may also be computed using Equation (6a) in which i is an index for the active frequency bands, $PD_{norm\_i}$ is the normalized PD distribution for the $i^{th}$ active frequency band, $Tx_i$ is the transmission power level for the $i^{th}$ active frequency band, and $TX_{PDi}$ is the transmission power level for the normalized PD distribution for the $i^{th}$ active frequency band.

Example Method to Distinguish between Cover and Human Grip

As noted above, in wireless communication, there is a maximum permissible exposure (MPE) limit from international regulators, including the International Commission on Non-Ionizing Radiation Protection (ICNIRP) and the Federal Communications Commission (FCC) in the United States, that specifies the highest power or energy density (in $W/cm^2$ or $J/cm^2$) of an electromagnetic source that is considered safe. In some cases, the MPE limit(s) may be converted into a constraint related to the maximum transmission power by one or more devices (e.g., depending on the implementation of each of the devices) and, thus, an uplink (UL) signal transmitted by a device may be limited due to MPE compliance.

Some UEs may include sensors (e.g., millimeter wave (mmW) sensors) that allow for higher UL transmission power levels if the sensor output shows no detection of an object blocking the UE antenna(s), potentially boosting UL throughput with transmission at such higher power levels.

Figure 4A:
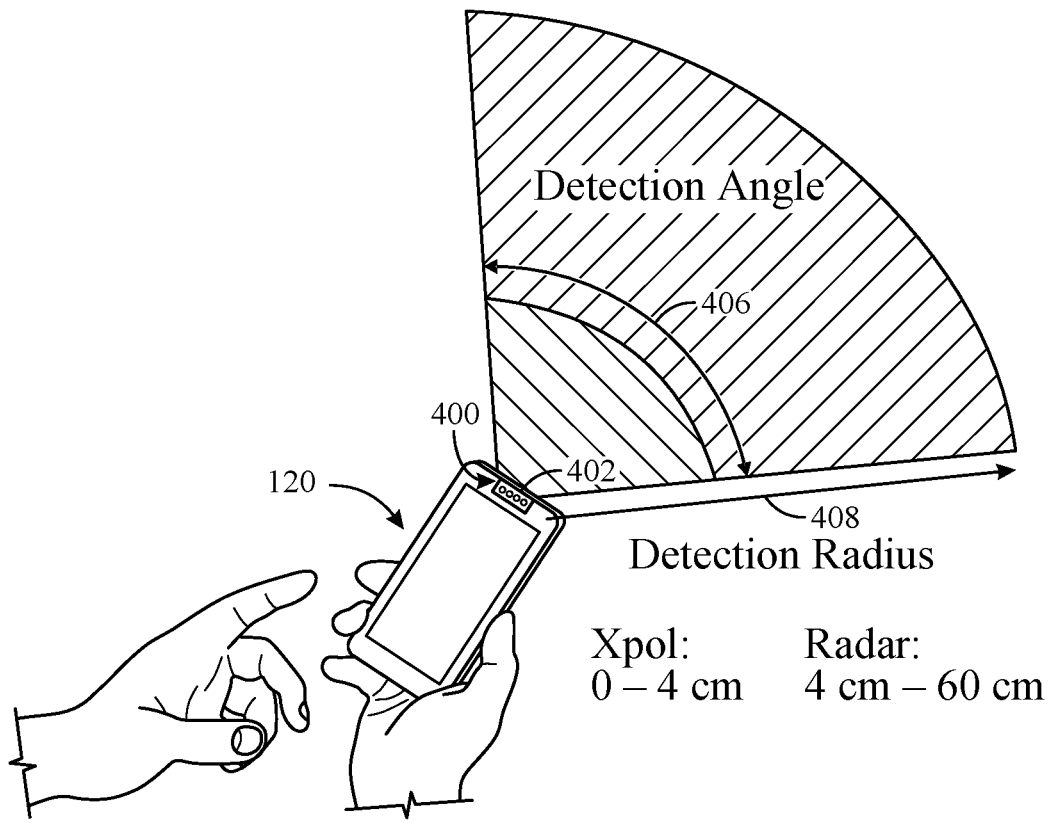
FIG. 4A illustrates millimeter wave (mmW) sensing by a UE, in accordance with certain aspects of the present disclosure.
Figure 4B:
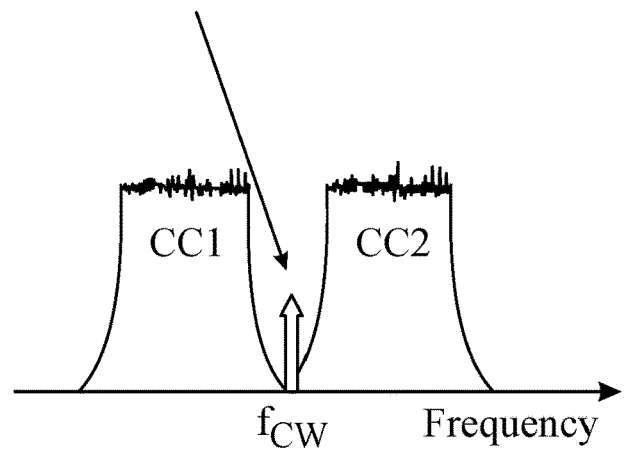
FIG. 4B illustrates mmW sensing using cross-polarization (Xpol), in accordance with certain aspects of the present disclosure.
Figure 4B:
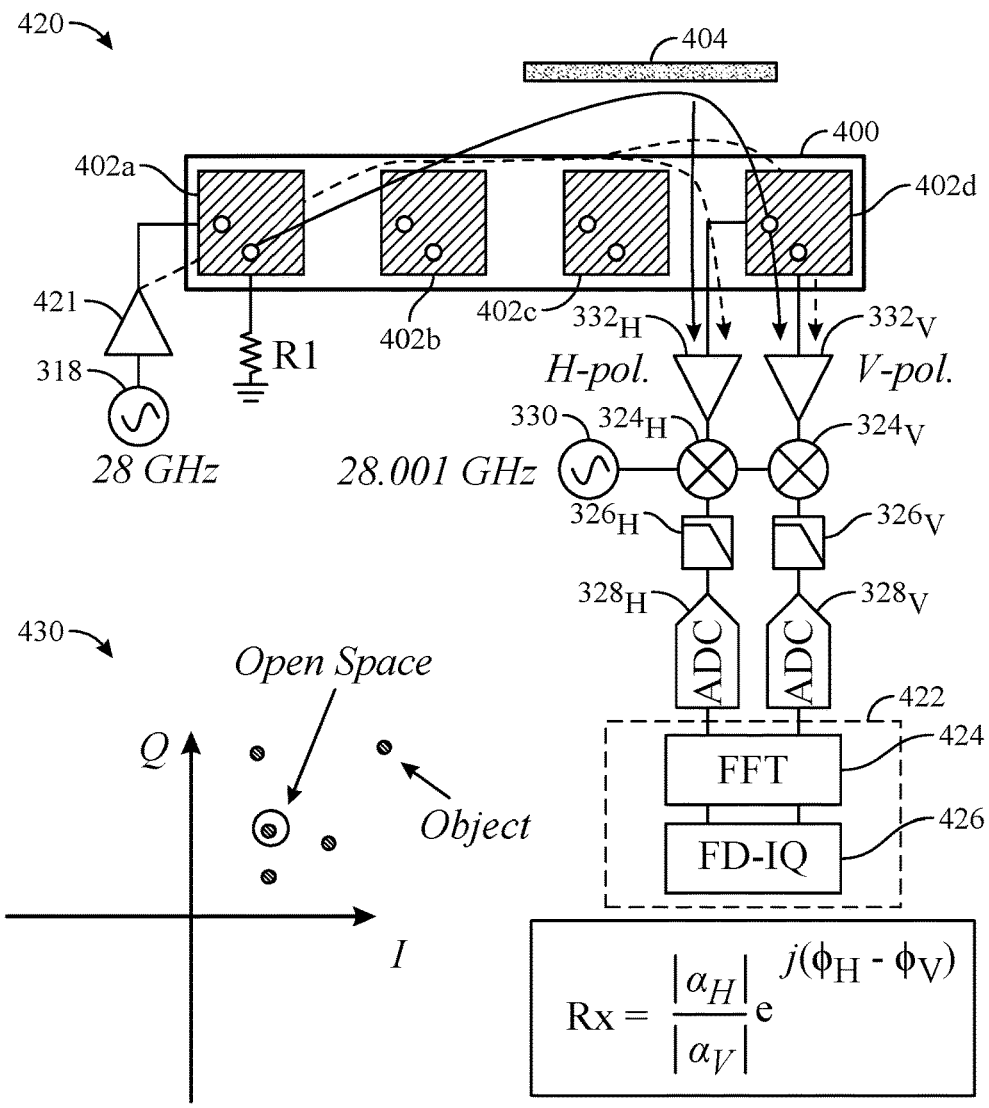
Figure 4C:
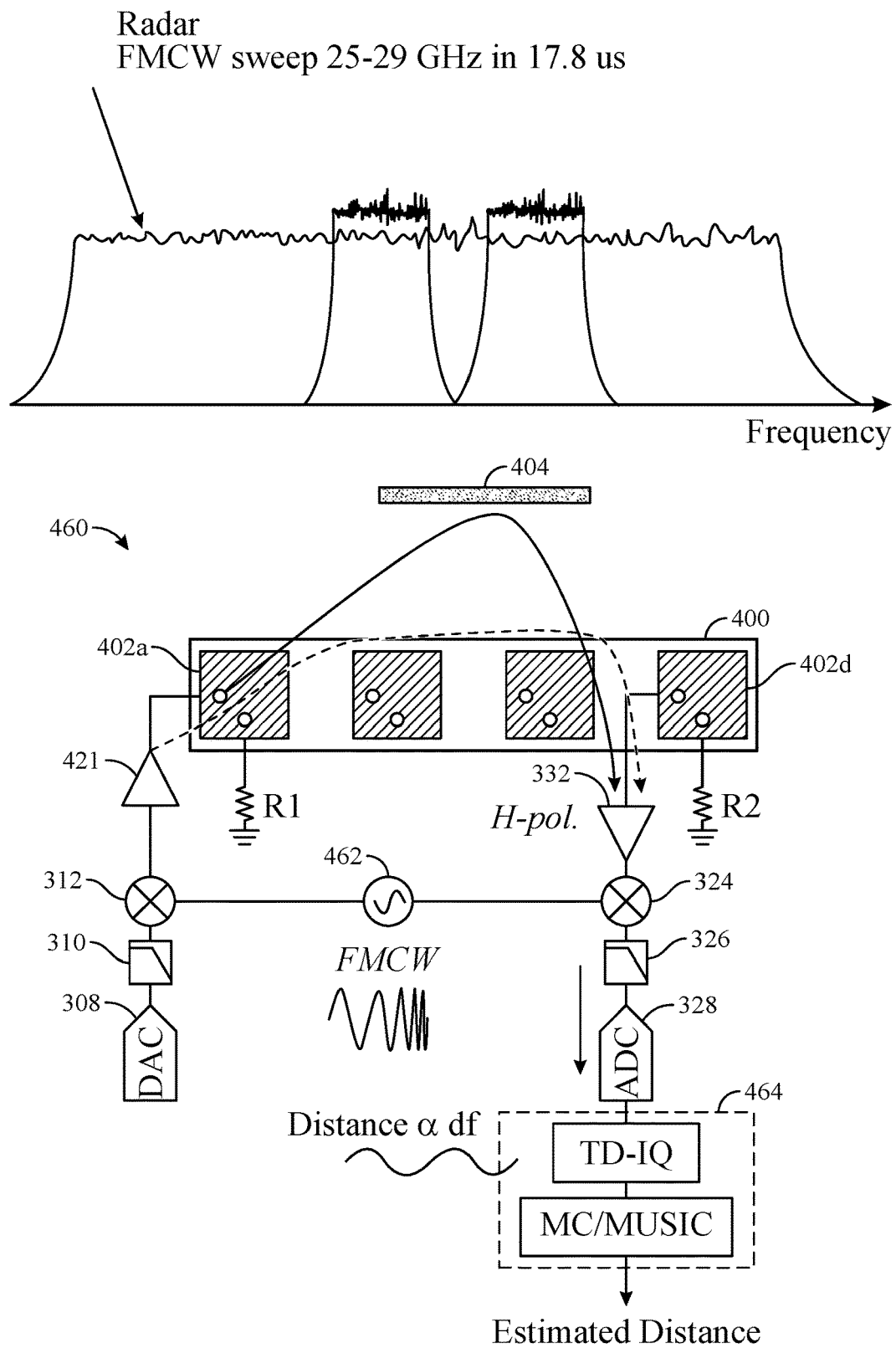
FIG. 4C illustrates mmW sensing using frequency-modulated continuous-wave (FMCW) radar, in accordance with certain aspects of the present disclosure.

For example, FIG. 4A illustrates mmW sensing by a UE 120 using such object-detection sensors. In FIG. 4A, the UE 120 includes at least one antenna array 400 with multiple antennas 402a-d (collectively referred to herein as "antennas 402"). To detect an object 404 (shown in FIGS. 4B and 4C) or an open space (OS) condition, the UE 120 may output a signal (e.g., a continuous wave (CW), out-of-band signal) from one of the antennas 402 in the array 400 (e.g., from antenna 402a) with a particular detection angle 406, and another antenna (e.g., antenna 402d) in the array may receive signals reflected from the surface of a nearby object 404, such as a protective cover or a human hand or finger. With the reflected signals, the UE 120 may utilize cross-polarization (Xpol) as illustrated in FIG. 4B with two polarized receive paths (one for the horizontal polarization component (labeled "H-pol") in the circuit diagram 420 and another for the vertical polarization component (labeled "V-pol") to determine a cross-polarization ratio ($K=k_V/k_H$) and detect whether an object 404 is present. Additionally or alternatively, the UE 120 may employ frequency-modulated continuous-wave (FMCW) radar for object detection, as illustrated in FIG. 4C with the example frequency sweep and the circuit diagram 460. As illustrated in FIG. 4A, Xpol may have an object detection radius 408 ranging from 0 to about 4 cm from the UE 120, whereas FMCW radar may have an objection detection radius ranging from about 4 cm to about 60 cm from the UE.

As explained above, FIG. 4B illustrates mmW sensing using cross-polarization (Xpol) to detect an object 404 near a UE or to detect an OS condition, in accordance with certain aspects of the present disclosure. In FIG. 4B, the antenna array 400 comprises four antennas 402, although any suitable number of antennas may be used. In the circuit diagram 420, the transmit path (e.g., transmit path 302) includes a frequency synthesizer (e.g., the TX frequency synthesizer 318) and an amplifier 421. The frequency synthesizer is used to generate a CW signal having a frequency (fcw) that is out of band, for example, between a first component carrier band (CC1) and a second component carrier band (CC2). In this example, fcw is 28 GHz. The amplifier 421 may amplify the CW signal and drive the antenna 402a to wirelessly transmit the signal (e.g., with a particular detection angle 406).

If there is an object 404 near the UE, a surface of the object may reflect the transmitted signal, and another antenna (e.g., antenna 402d) in the antenna array 400 may receive signals reflected from the surface of the object. For Xpol detection, the receive path (e.g., receive path 304) may include two polarized receive paths (one for the horizontal polarization component (labeled "H-pol") in the circuit diagram 420 and another for the vertical polarization component (labeled "V-pol"). The H-pol receive path includes an amplifier (e.g., a low noise amplifier $332_H$), a mixer $324_H$, a filter (e.g., baseband filter $326_H$), and an ADC $328_H$. Similarly, the V-pol receive path includes an amplifier (e.g., a low noise amplifier $332_V$), a mixer $324_V$, a filter (e.g., baseband filter $326_V$), and an ADC $328_V$. A frequency synthesizer (e.g., an RX frequency synthesizer 330) may generate a local oscillator (LO) signal (e.g., having a frequency of 28.001 GHz, offset 100 MHz from the transmitted signal) as an input to each of the H-pol and V-pol mixers $324_H$, $324_V$. These receive chain components in FIG. 4B may function as described above with respect to FIG. 3, amplifying received RF signals, mixing the amplified RF signals with the LO signal to downconvert the signals, filtering the mixed signals to focus on the baseband signals, and digitizing the baseband signals.

The H-pol and V-pol digitized signals from the ADCs may be sent to a processor 422, which may be implemented by a digital signal processor (DSP) or any other suitable processing system. The processor 422 may include a fast Fourier transform (FFT) module 424 and a frequency-domain in-phase/quadrature (FD-IQ) module 426. The FFT module 424 may be used to convert the time-domain digitized signals to frequency-domain data, which may yield a maximum H-pol FFT value ($k_H$) and a maximum V-pol FFT value ($k_V$), as explained below with respect to FIG. 5. Using the frequency-domain data, the FD-IQ module 426 may be used to plot the cross-polarization ratio ($K=k_V/k_H$) in the I/Q plane, as illustrated in the graph 430. Open space (i.e., no nearby object) may have a different location in the UQ plane than various objects, and in this manner, Xpol may be used to determine whether an object is present.

As explained above, FIG. 4C illustrates mmW sensing using FMCW radar to detect an object 404 near a UE or to detect an OS condition, in accordance with certain aspects of the present disclosure. In FIG. 4C, the antenna array 400 comprises four antennas 402, although any suitable number of antennas may be used. In the circuit diagram 460, the transmit path (e.g., transmit path 302) includes a DAC 308, a baseband filter 310, a mixer 312, and the amplifier 421, which may represent the DA 314 and/or the PA 316. A frequency synthesizer 462 may be used to generate an LO signal for inputting to the mixer 312. The frequency synthesizer 462, in conjunction with the other components of the transmit path, may be used to generate a frequency sweep (e.g., from 25 to 29 GHz), which may include CC1 and CC2 bands as shown, in a wirelessly transmitted signal output from the antenna 402a, for example.

If there is an object 404 near the UE, a surface of the object may reflect the transmitted signal, and another antenna (e.g., antenna 402d) in the antenna array 400 may receive signals reflected from the surface of the object. For FMCW radar detection, the receive path (e.g., receive path 304) may include a low noise amplifier 332, a mixer 324, a baseband filter 326), and an ADC 328. These receive path components in the circuit diagram 460 of FIG. 4C may function as described above with respect to FIG. 3, amplifying received RF signals, mixing the amplified RF signals with the LO signal from the frequency synthesizer 462 to downconvert the signals, filtering the mixed signals to focus on the baseband signals, and digitizing the baseband signals. The FMCW digitized signals from the ADC 328 may be sent to a processor 464, which may be implemented by a DSP or any other suitable processing system. The processor 464 may process the FMCW digitized signals to detect an object or an open space condition.

Figure 5:
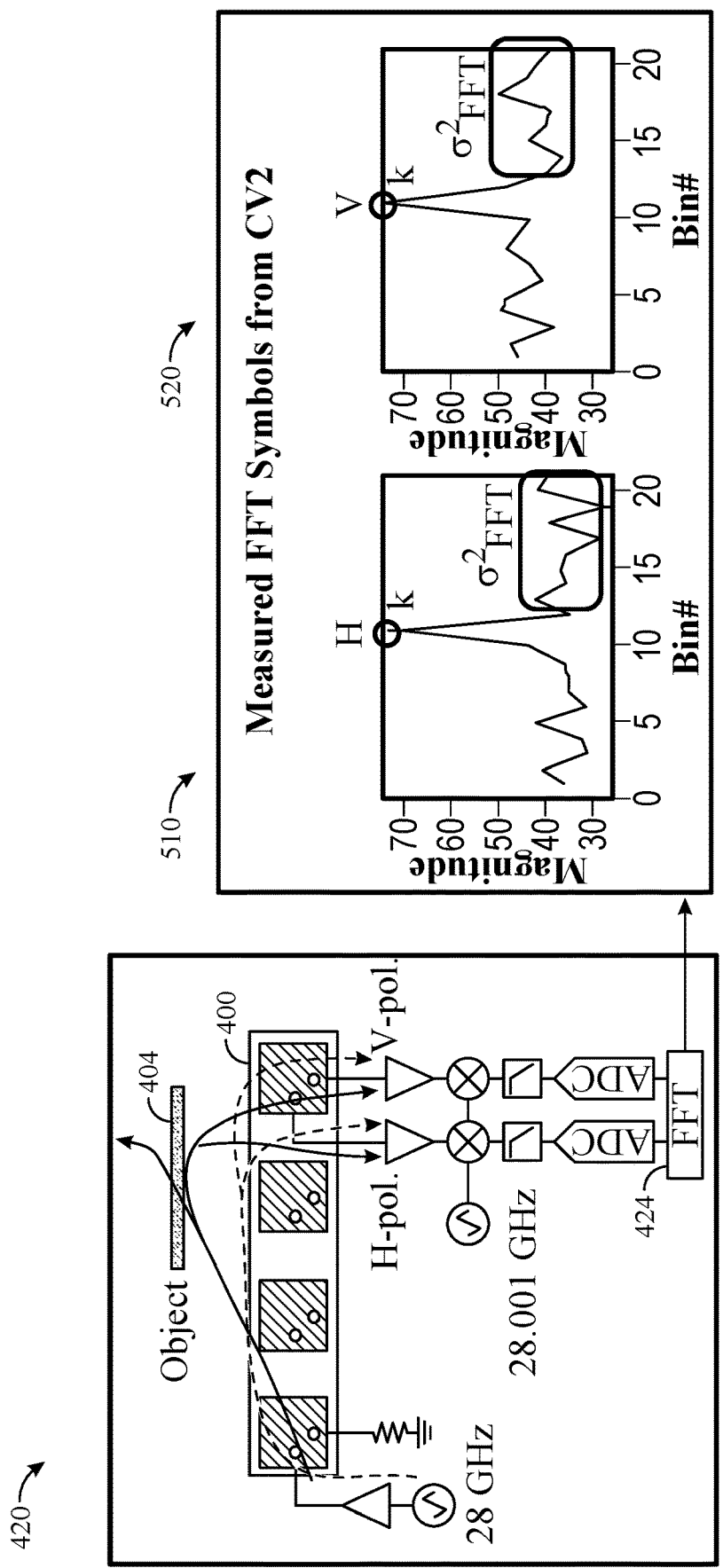
FIG. 5 illustrates example fast Fourier transform (FFT) symbol values from Xpol detection, in accordance with certain aspects of the present disclosure.

FIG. 5 illustrates example FFT symbol values from Xpol detection, in accordance with certain aspects of the present disclosure. The FFT symbol values include horizontal polarization FFT values 510 based on digitized signals from the H-pol receive path and vertical polarization FFT values 520 based on digitized signals from the V-pol receive path. The maximum value of the horizontal polarization FFT values 610 indicates $k_H$, whereas the maximum value of the vertical polarization FFT values 620 indicates $k_V$. The cross-polarization ratio (K) is determined by $K=k_V/k_H$.

Figure 6:
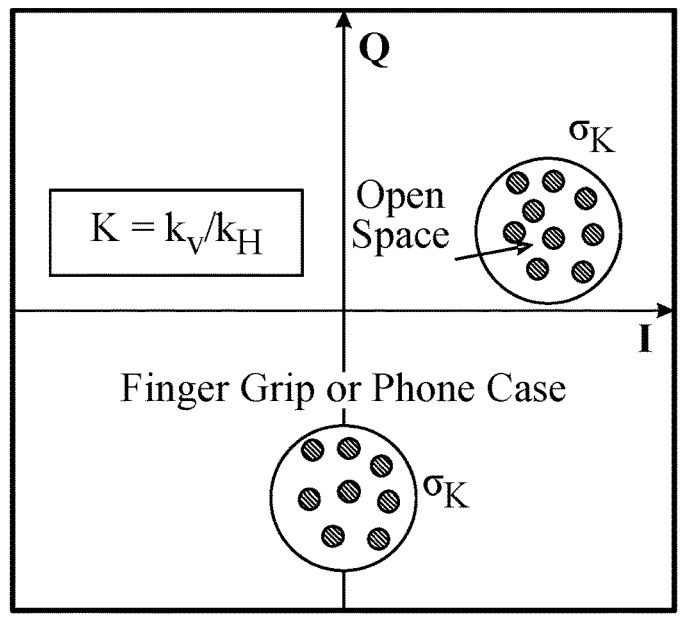
FIG. 6 is an example plot of cross-polarization ratios (K) in the in-phase/quadrature (IQ) plane for detection of an object in front of an antenna, in accordance with certain aspects of the present disclosure.

The complex value of K (I+jQ) provides an indication of the presence of an object in front of the antenna. $k_V/k_H$ division (which may be implemented as $k_V/k_H^*$) may eliminate calibration of the transmit gain/phase randomness during each measurement. FIG. 6 is an example plot 600 of multiple samples of K in the in-phase/quadrature (IQ) plane for two different scenarios: open space and a finger grip (or protective case).

The standard deviation of consecutive K measurements over time ($\sigma_K$) provides a metric of stability of an object in front of the antenna. In other words, a relatively larger $\sigma_K$ means less object stability (i.e., more object movement), whereas a relatively smaller $\sigma_K$ indicates greater stability (i.e., less object movement). Open space (i.e., no reflector) provides a relatively smaller $\sigma_K$. A human finger or hand not gripping the UE in front of an antenna provides a relatively larger $\sigma_K$, but a finger gripping the UE provides a relatively smaller $\sigma_K$ because a finger does not move as much when part of a grip. Similar to a finger with grip, protective cases (e.g., made of plastic and/or glass) also provide smaller $\sigma_K$, thereby making it difficult to differentiate a protective cover from a human grip using only $\sigma_K$. For example, as illustrated in the example plot 600 of FIG. 6, the $\sigma_K$ for open space may be similar to the $\sigma_K$ for a protective case (or a finger grip).

A higher transmission power may be used by a UE when the antenna is blocked by a protective case, but a lower transmission power should be used when the antenna is blocked by a finger or other human tissue, due to MPE limits, as described above. Therefore, what is needed are techniques and apparatus for differentiating between a protective cover and human grip by object-detection sensors of a UE.

Furthermore, different protective cases may provide different cross-polarization ratio centers {mean(K)} in the IQ plane. An algorithm for determining transmission power may periodically adapt the open space parameters for a UE, which, when combined with the different K centers for different protective cases, may also make it more difficult to differentiate a protective case from finger grip.

Certain aspects of the present disclosure provide techniques and apparatus for distinguishing between an antenna of a UE being blocked by a cover (e.g., a protective rubber or plastic case) or by human tissue (e.g., a finger or palm) using at least two different types of parameters, as described in greater detail below.

Figure 7:
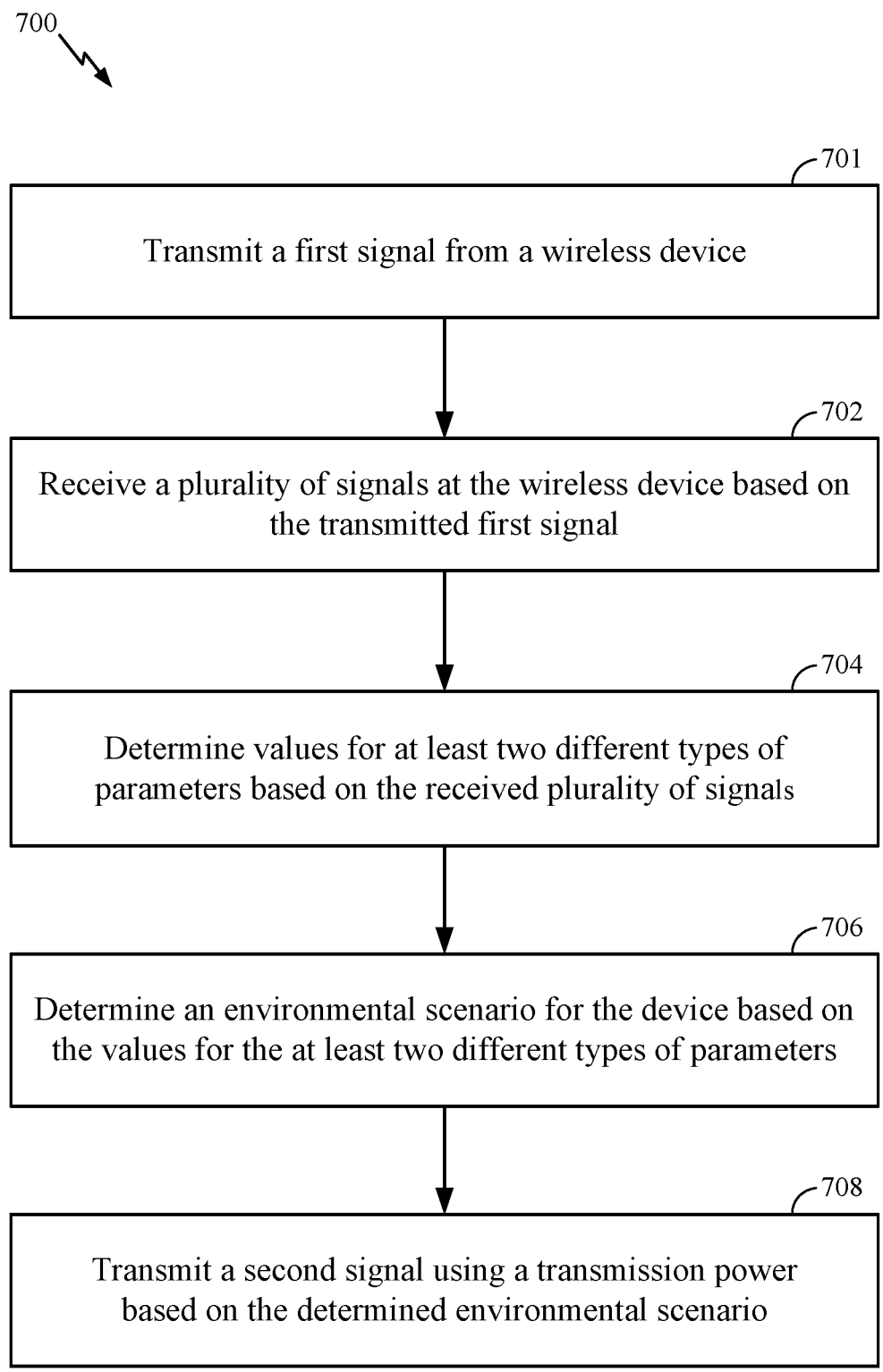
FIG. 7 is a flow diagram of example operations for wireless communications, in accordance with certain aspects of the present disclosure.

FIG. 7 is a flow diagram illustrating example operations 700 for wireless communications, in accordance with certain aspects of the present disclosure. The operations 700 may be performed, for example, by a wireless device (e.g., UE 120 of FIG. 1), and more particularly, by a receiver, processor, and transmitter of the wireless device.

The operations 700 may begin, at block 701, with the wireless device transmitting a first signal (e.g., with the TX front-end circuits 254-254r or the transmit path 302 of the UE 120) and, at block 702, receiving a plurality of signals (e.g., with the RX front-end circuits 254-254r or the receive path 304 of a UE 120) based on the transmitted first signal (e.g., reflections of the transmitted first signal). At block 704, the wireless device determines values for at least two different types of parameters based on the received plurality of signals (e.g., with the receive processor 258, the control/processor 280, and/or the transmit processor 264 or with the processor 422 of the UE 120). At block 706, the wireless device determines an environmental scenario for the device based on the values for the at least two different types of parameters (e.g., with the receive processor 258, the control/processor 280, and/or the transmit processor 264 or with the processor 422 of the UE 120). At block 708, the wireless device transmits a second signal using a transmission power based on the determined environmental scenario (e.g., with the TX front-end circuits 254-254r or the transmit path 302 of the UE 120). The operations 700 are described in greater detail below and illustrated in the various drawings.

As presented above, $\sigma_K$ may be insufficient to distinguish between a protective cover and human grip. Therefore, certain aspects of the present disclosure provide another dimension of information in addition to $\sigma_K$. For certain aspects, this additional information may be determined from the FFT data already provided by the two polarized receive paths.

For example, empirical studies show the signal-to-noise ratio (SNR) of FFTs from H-pol and V-pol fluctuate with different types of objects. The SNR of the vertical polarization component ($SNR_V$) may be expressed as $SNR_V=10*\log_{10}(k_V/\sigma^2_{FFTV})$, where $\sigma^2_{FFTV}$ is the variance of the vertical polarization FFT values (e.g., FFT values 520). The SNR of the horizontal polarization component ($SNR_H$) may be expressed as $SNR_H=10*\log_{10}(k_H/\sigma^2_{FFTH})$, where $\sigma^2_{FFTH}$ is the variance of the horizontal polarization FFT values (e.g., FFT values 510). The mean SNR ($SNR_m$) of these two SNRs may be expressed as $SNR_m=SNR_V-(SNR_H-SNR_V)$. The processor (e.g., processor 422) calculating the FFT values may calculate the noise power of a number of bins adjacent to the $k_H$ or kv peak (e.g., 20 adjacent bins, 10 bins on either side of the peak). For certain aspects, the processor may remove or otherwise effectively ignore bins that have spurs.

Electromagnetic (EM) simulations show that the near-field coupled electric field changes with the dielectric that mimics a human finger. The hypothesis for observed SNR fluctuations is that coupled signal power fluctuates relative to a fixed receiver noise floor (e.g., according to kTBFG, where k is Boltzmann's constant, T is absolute temperature, F is the noise figure, B is the reception bandwidth, and G is the gain) and has a correlation to the type of material due to the reflection coefficient of the material.

Figure 8:
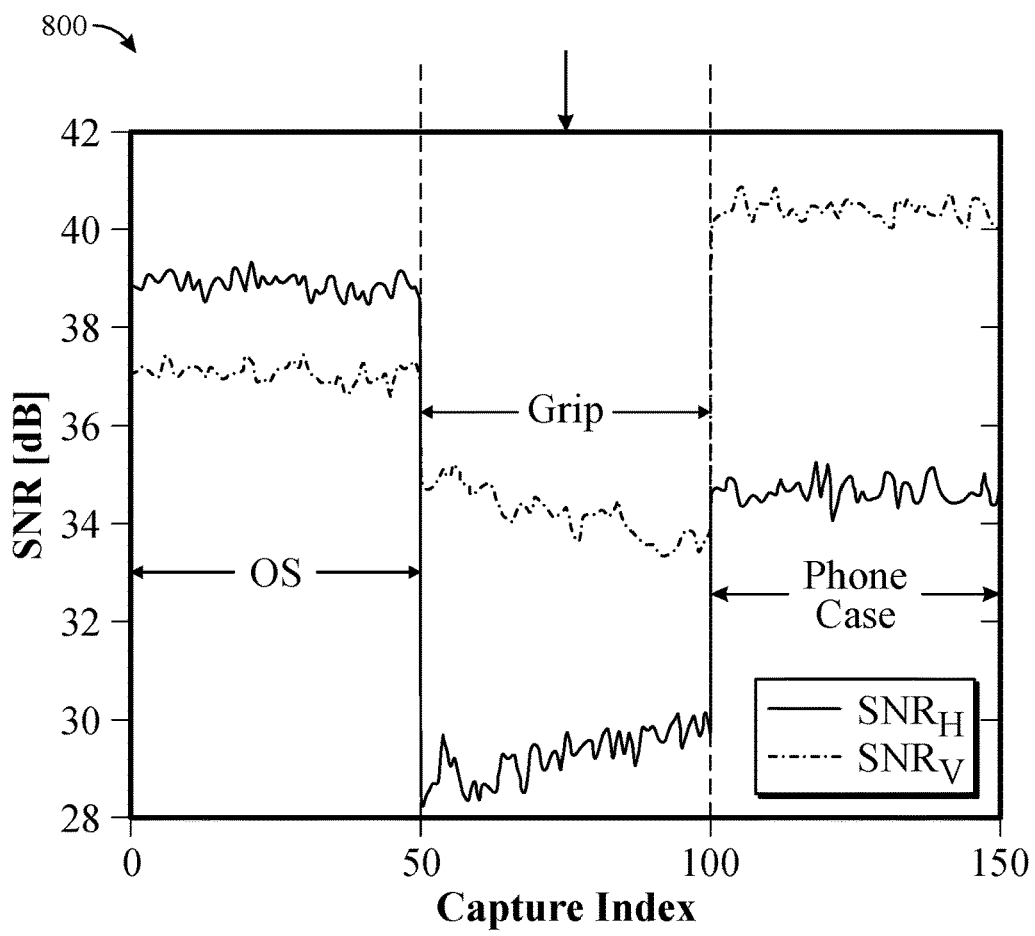
FIG. 8 is an example plot of signal-to-noise ratio (SNR) in decibels (dB) of vertical and horizontal polarization components for different scenarios, in accordance with certain aspects of the present disclosure.

FIG. 8 is an example plot 800 of SNR in decibels (dB) of vertical and horizontal polarization components for different scenarios, including open space (OS), grip, and protective case. Thus, with this additional information, different environmental scenarios that produce the same $\sigma_K$ can be differentiated by also looking at $SNR_m$.

Figure 9:
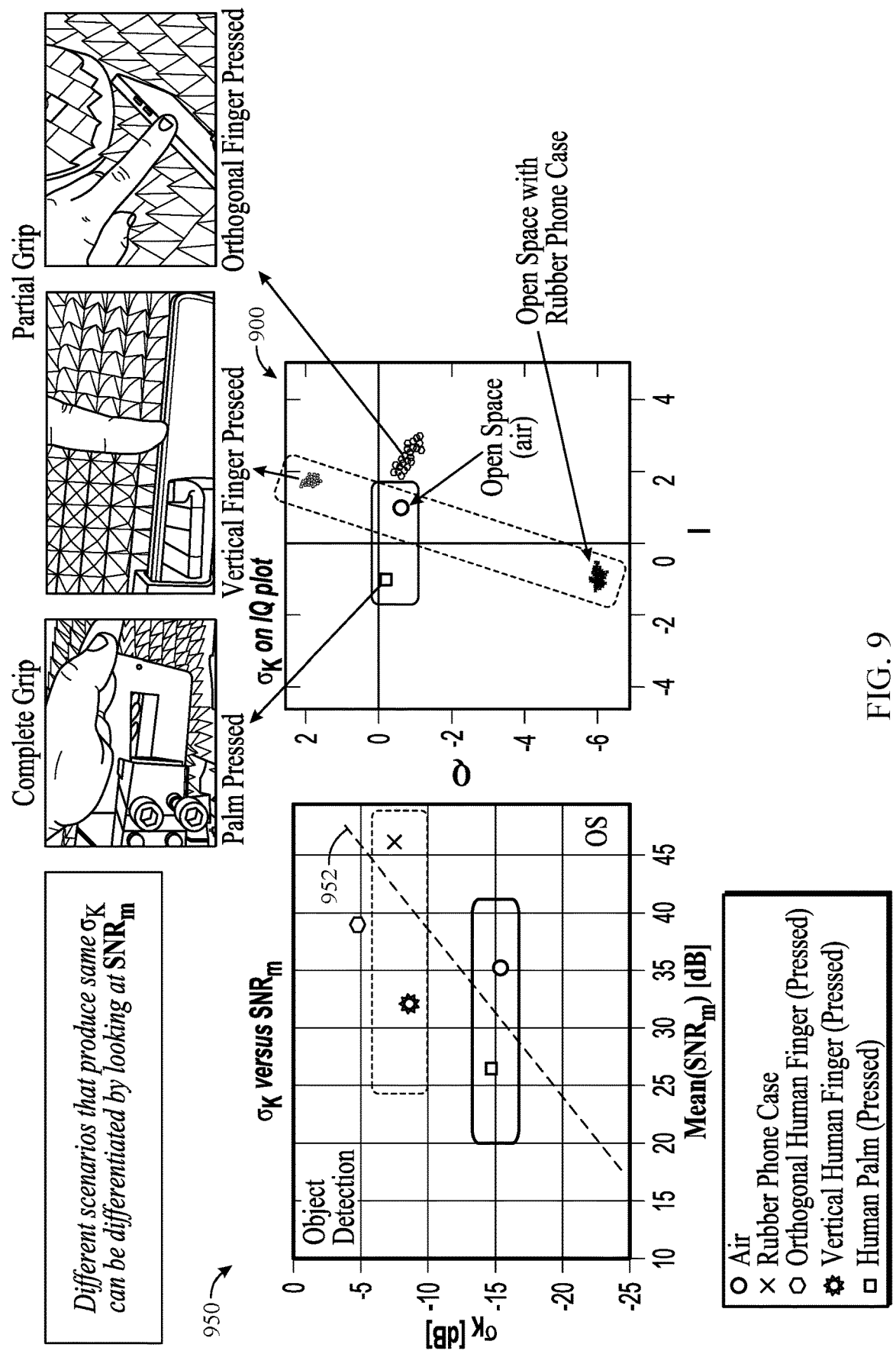
FIG. 9 illustrates an example correlation between standard deviation of K values (GK) and the mean signal-to-noise ratio ($SNR_m$) of the vertical and horizontal polarization components for different scenarios, in accordance with certain aspects of the present disclosure.

FIG. 9 illustrates an example plot 900 of K for different scenarios in the IQ plane. In the IQ plot 900, an orthogonal human finger pressed against the UE has a relatively very large $\sigma_K$, as shown by the spread of the K values. In contrast, open space and a human palm pressed against the UE have similar, relatively small $\sigma_K$, and a rubber protective case and a vertical human finger pressed on the UE have a similar, albeit noticeably larger $\sigma_K$. Therefore, considering only $\sigma_K$ may make it difficult to distinguish between open space, a protective case, or a human tissue condition.

FIG. 9 also illustrates a graph 950 showing an example correlation between $\sigma_K$ and $SNR_m$ for the same scenarios presented in the IQ plot 900, in accordance with certain aspects of the present disclosure. Using regression or any of various other suitable techniques, a linear equation can be found to separate scenarios that may be categorized as OS (e.g., OS or protective cover) and scenarios that may be categorized as object detection (e.g., presence of human tissue), for the purposes of determining transmission power. The line 952 represented by this linear equation in the graph 950 may be considered as a boundary separating the two regions: an OS region versus an object detection region. The threshold standard deviation ($\sigma_{TH}$) of this OS/detection boundary line 952 may be expressed as $\sigma_{TH}=m*SNR_m+c$, where m is the slope of the line and c is the $\sigma_K$ offset.

Figure 10:
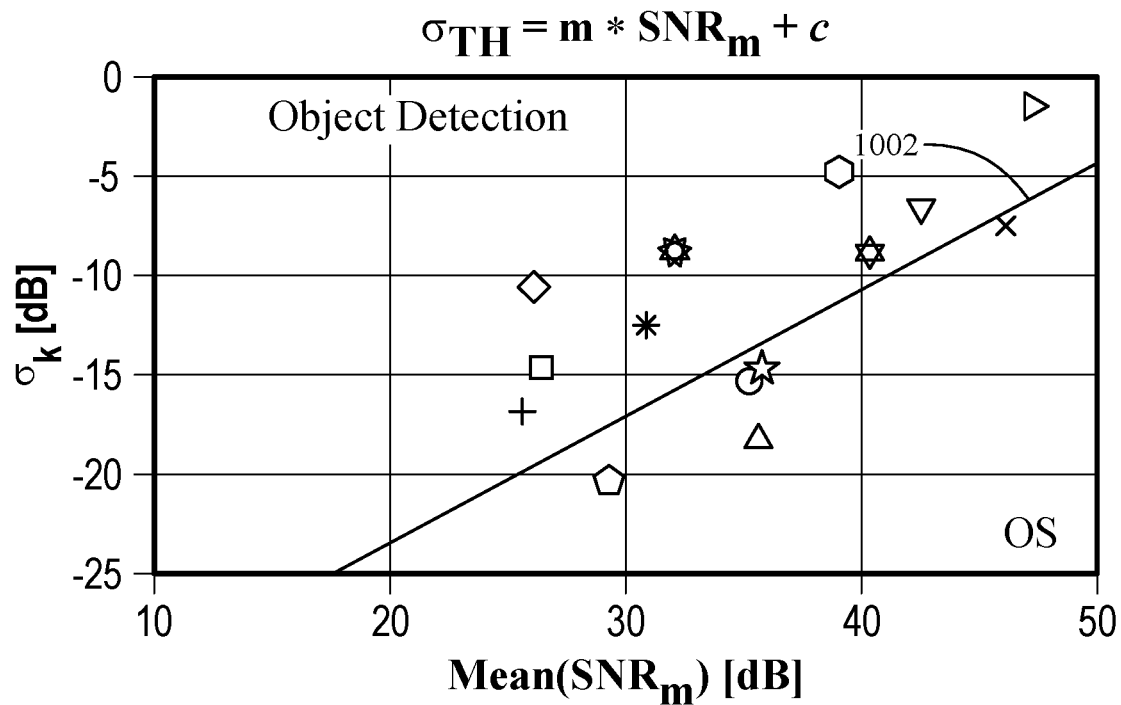
FIG. 10 illustrates an example linear relationship between $\sigma_K$ and $SNR_m$ for different scenarios, where the line represents a boundary between open space (OS) versus detection boundary, in accordance with certain aspects of the present disclosure.

FIG. 10 is a graph 1000 illustrating an example linear relationship between $\sigma_K$ and $SNR_m$ for different scenarios (e.g., different materials), where the line 1002 with equation $\sigma_{TH}=m*SNR_m+c$ represents a boundary between open space (OS) and object detection regions, in accordance with certain aspects of the present disclosure. Note how air, the rubber protective case, and the plastic phone back housing are in the OS region, whereas the pressed horizontal human finger, the pressed human palm, the pressed orthogonal human finger, and the pressed vertical human finger are in the detection region. The linear equation may be frequency or band dependent. Additionally or alternatively, the linear equation may be dependent on the specific UE, varying between types, brands, and models.

Figure 11:
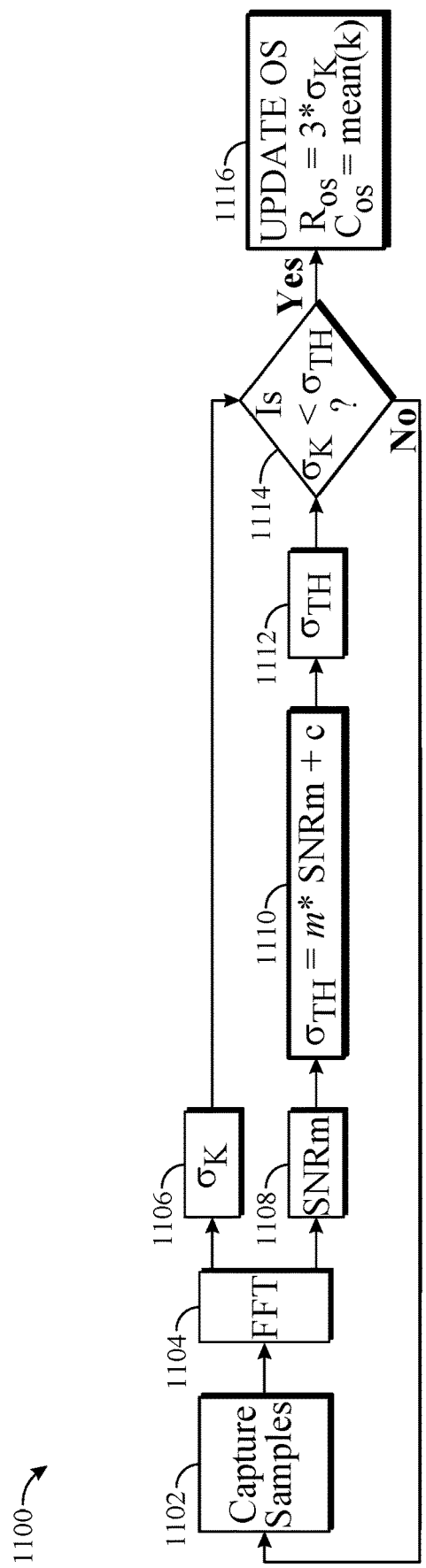
FIG. 11 is a flow chart for determining parameters for OS based on $\sigma_K$ and $SNR_m$, in accordance with certain aspects of the present disclosure.

FIG. 11 is a flow chart 1100 for determining parameters for OS based on $\sigma_K$ and $SNR_m$, in accordance with certain aspects of the present disclosure. The parameters for OS may include the radius ($R_{OS}$) and the center ($C_{OS}$) of the OS. As shown in the flow chart 1100, if $\sigma_K<\sigma_{TH}$ (indicating the OS region), then the OS parameters may be updated, where $R_{OS}=3*\sigma_K$ and where $C_{OS}=$mean (K). Otherwise, the OS parameters are not updated, and more samples are captured. More specifically, samples (e.g., Xpol samples) are captured at block 1102, and an FFT is performed on the captured samples at block 1104 to convert the sampled data from the time domain to the frequency domain. From the FFT, $\sigma_K$ may be determined at block 1106, and the $SNR_m$ may be determined at block 1108, as described above. At block 1110, the variables (e.g., m and c) of the linear equation for the boundary between open space and object detection regions (e.g., line 952 or line 1002) may be determined (e.g., read from memory, such as from memory 282). At block 1112, $\sigma_{TH}$ may be calculated using the variables for the linear equation and $SNR_m$. If $\sigma_K<\sigma_{TH}$ (indicating the OS region) as determined at block 1114, then the OS parameters are updated at block 1116, where $R_{OS}=3*\sigma_K$ and where $C_{OS}=$mean (K). Otherwise, if $\sigma_K\geq\sigma_{TH}$ as determined at block 1114, the OS parameters are not updated, and more samples are captured at block 1102.

As described above, certain aspects of the present disclosure are directed to a method for wireless communications by a UE. The method generally includes receiving a plurality of signals at the UE, determining values for at least two different types of parameters based on the received plurality of signals, determining an environmental scenario for the UE based on the values for the at least two different types of parameters, and transmitting a signal using a transmission power based on the determined environmental scenario.

According to certain aspects, the received plurality of signals includes a vertical polarization component signal and a horizontal polarization component signal. For certain aspects, the at least two different types of parameters comprise a statistic of a cross-polarization ratio between the vertical polarization component signal and the horizontal polarization component signal. For example, the statistic of the cross-polarization ratio may be a standard deviation of the cross-polarization ratio. For certain aspects, the at least two different types of parameters further include a statistic of a signal-to-noise ratio based on the vertical polarization component signal and the horizontal polarization component signal. For example, the statistic of the signal-to-noise ratio may be a mean of the signal-to-noise ratio calculated based on a variance of the vertical polarization component signal and on a variance of the horizontal polarization component signal.

According to certain aspects, the at least two different types of parameters include a statistic of a signal-to-noise ratio based on the vertical polarization component signal and the horizontal polarization component signal.

According to certain aspects, receiving the plurality of signals entails receiving the vertical polarization component signal via a vertically polarized receive path of the UE and receiving the horizontal polarization component signal via a horizontally polarized receive path of the UE.

According to certain aspects, the method further involves transmitting a test signal from the UE. In some cases, the test signal may be a continuous wave (CW) signal or a frequency-modulated continuous-wave (FMCW) radar signal. For certain aspects, the test signal is transmitted from an antenna in an antenna array of the UE, and the plurality of signals is received by another antenna in the antenna array.

According to certain aspects, determining the environmental scenario entails distinguishing between an antenna of the UE being blocked by a cover or by human tissue. For example, the cover may include a protective case for the UE.

According to certain aspects, determining the environmental scenario involves determining a center and a radius of an open space from an antenna of the UE.

According to certain aspects, determining the environmental scenario includes determining a line (e.g., a line, such as line 952 or line 1002) based on a linear relationship between the at least two types of parameters and determining whether one of the at least two types of parameters is above the line. In this case, the signal may be transmitted using a relatively lower transmission power if the one of the at least two types of parameters is above the line, whereas the signal may be transmitted using a relatively higher transmission power if the one of the at least two types of parameters is not above the line. For certain aspects, parameters of the line (e.g., the slope and the offset) may be stored in memory.

According to certain aspects, determining the environmental scenario involves determining a boundary based on a relationship between the at least two types of parameters and determining whether one of the at least two types of parameters is on a first side of the boundary or a second side of the boundary. In this case, the signal may be transmitted using a relatively lower transmission power if the one of the at least two types of parameters is on the first side of the boundary, whereas the signal may be transmitted using a relatively higher transmission power if the one of the at least two types of parameters is on the second side of the boundary.

According to certain aspects, determining the environmental scenario involves determining a material of a protective case covering the UE. For certain aspects, the received plurality of signals includes a vertical polarization component signal and a horizontal polarization component signal, and the at least two different types of parameters comprise a statistic of a cross-polarization ratio between the vertical polarization component signal and the horizontal polarization component signal. In this case, determining the material of the protective case covering the UE may be based, at least in part, on the statistic of the cross-polarization ratio. For example, the statistic may be a standard deviation of the cross-polarization ratio.

Example Cover Detection

As described above, demodulated signals in the complex IQ domain have a unique value for open space (with no object), a human object, or a cover (e.g., a protective case). Relative to a factory calibrated or characterized open space, both a human object and a cover may be interpreted as objects triggering a detection. However, if the complex IQ domain value of the cover is known by the original equipment manufacturer (OEM), entry of this value to the UE detection algorithm may be used to further differentiate the human object from the cover.

In cases were the unique value of the cover is not known, a detection technique may be employed. For example, as described above, each material exhibits a relationship between the standard deviation (or variance) of the complex IQ domain values (e.g., $\sigma_K$) and the SNR difference between horizontal and vertical polarization components (as shown in FIGS. 6 and 9). For certain aspects, classification as open space with covers and classification as detected objects with covers may also be differentiated by the detection algorithm querying a database of characterized materials and scenarios (e.g., as depicted in FIGS. 9 and 10).

The material of a protective cover covering the mmW antenna array (e.g., array 400) can negatively impact the UE's performance. For certain aspects, a cover-material-specific antenna array codebook may be selected (instead of an array codebook intended for an uncovered UE) upon detecting the cover (or more specifically, the material composing the cover) to improve performance. For example, the UE may be preprogrammed with a codebook associated with specific complex IQ values of a known cover (e.g., a first-party cover). Upon detecting the cover's material via the specific complex IQ values, the preprogrammed codebook may be selected, which can improve mmW performance.

According to certain aspects, a cover-specific detection scheme (e.g., based on a radio frequency identification (RFID) tag or the like) may be utilized in conjunction with the detection algorithm, as presented above. For example, covers with similar material detection properties (e.g., a first-party protective case and a third-party "knock-off" case, made of the same material(s) with similar dimensions) may be further verified if the cover includes some form of wireless ID included in a tag. For certain aspects, the tag may also be preprogrammed to include material properties of the cover, which can be verified by the detection algorithm described herein to be used with selecting the appropriate array codebook. The added layer of verification may, for example, assist with safety compliance and/or allow for further tailored codebooks (e.g., cover-specific as compared to cover-material-specific).

Figure 12:
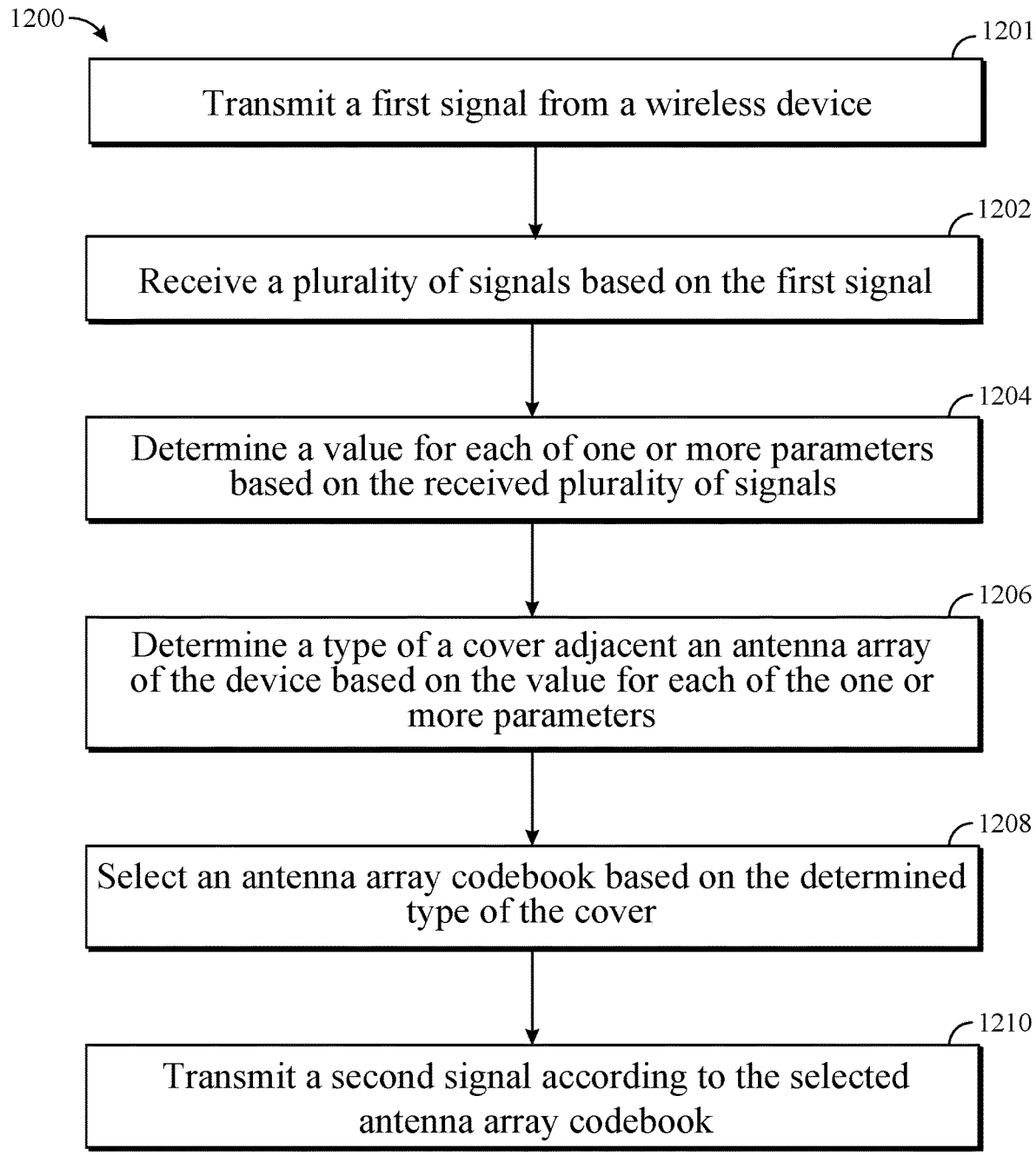
FIG. 12 is a flow diagram of example operations for wireless communications based on antenna array codebook selection, in accordance with certain aspects of the present disclosure.

FIG. 12 is a flow diagram of example operations 1200 for wireless communications based on antenna array codebook selection, in accordance with certain aspects of the present disclosure. The operations 1200 may be performed, for example, by a wireless device (e.g., UE 120 of FIG. 1), and more particularly, by a receiver, processor, and transmitter of the wireless device.

The operations 1200 may begin, at block 1201, with the wireless device transmitting a first signal (e.g., from the antenna array and with the TX front-end circuits 254-254r or the transmit path 302 of the UE 120). At block 1202, the wireless device receives a plurality of signals (e.g., with the RX front-end circuits 254-254r or the receive path 304 of a UE 120) based on the transmitted first signal. At block 1204, the wireless device determines a value for each of one or more parameters based on the received plurality of signals (e.g., with the processor 422). At block 1206, the wireless device determines a type of a cover adjacent an antenna array of the device based on the value for each of the one or more parameters (e.g., with the processor 422). At block 1208, the wireless device selects an antenna array codebook based on the determined type of the cover (e.g., with the processor 422). At block 1210, the wireless device transmits a second signal (from the antenna array) according to the selected antenna array codebook (e.g., with the TX front-end circuits 254-254r or the transmit path 302 of the UE 120).

According to certain aspects, determining the type of the cover at block 1206 entails determining a material of the cover. For example, the material of the cover may include at least one of plastic or rubber.

According to certain aspects, the cover includes a protective case for the UE.

According to certain aspects, the received plurality of signals includes a vertical polarization component signal and a horizontal polarization component signal. For certain aspects, the one or more parameters include a statistic of a cross-polarization ratio between the vertical polarization component signal and the horizontal polarization component signal. For example, the statistic of the cross-polarization ratio may be a standard deviation of the cross-polarization ratio. For certain aspects, the value of the cross-polarization ratio is plotted in an in-phase/quadrature (IQ) plane over time. For certain aspects, the one or more parameters further include a statistic of a signal-to-noise ratio based on the vertical polarization component signal and the horizontal polarization component signal. In this case, the statistic of the signal-to-noise ratio may be a mean of the signal-to-noise calculated based on a variance of the vertical polarization component signal and on a variance of the horizontal polarization component signal. For certain aspects, receiving the plurality of signals involves receiving the vertical polarization component signal via a vertically polarized receive path of the UE and receiving the horizontal polarization component signal via a horizontally polarized receive path of the UE.

According to certain aspects, the first signal may be a test signal transmitted from the wireless device. In this case, the transmitted test signal may be reflected by the cover to generate the plurality of signals received at the device. The test signal may include, for example, a continuous wave signal or a frequency-modulated continuous-wave (FMCW) radar signal.

According to certain aspects, the operations 1200 further involve wirelessly reading an identification tag associated with the cover. For example, the identification tag may be a radio frequency identification (RFID) tag. For certain aspects, determining the type of the cover at block 1206 entails comparing the type of the cover determined based on the value for each of the one or more parameters with a type of the cover based on the read identification tag. For certain aspects, the cover is a protective case for the UE, and in this case, the identification tag may indicate a particular model of the protective case.

CONCLUSION

Certain aspects of the present disclosure use a signal-processing algorithm with statistics to differentiate between an antenna of a user equipment (UE) being blocked by a cover (e.g., a protective rubber or plastic case) or by human tissue (e.g., a finger or palm). This provides for increased uplink (UL) throughput, while meeting regulatory RF exposure limits when the object is not present. As described above, an antenna array may transmit a weak CW signal from one of the antennas therein. One of the adjacent antennas in the array may receive near-field mmW electromagnetic (EM) fields and monitor the perturbation of the EM fields by looking at complex FFT values of two polarized receivers (e.g., H-pol and V-pol receive paths). By analyzing the standard deviation of the CW peak complex value and the SNR ratios of the two polarized receivers, aspects of the present disclosure may determine what type of material or hand grip is presented at or near the surface of the antenna, or at least be able to distinguish between a cover and human tissue.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function. For example, means for receiving may include the RX front-end circuits 254-254r of FIG. 2 or the receive path 304 of FIG. 3. Means for transmitting may include the TX front-end circuits 254-254r of FIG. 2 or the transmit path 302 of FIG. 3. Means for determining and/or means for selecting may include at least one processor, such as the receive processor 258, the controller/processor 280, and/or the transmit processor 264 of FIG. 2 or the processor 422 of FIG. 4B.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules, and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for wireless communications by a wireless device, comprising:
   wirelessly reading an identification tag associated with a cover covering at least a portion of the wireless device;
   determining a type of the cover based on the identification tag associated with the cover;
   transmitting a signal based on the determined type of the cover; and
   selecting an antenna array codebook, from a plurality of predefined antenna array codebooks, based on the determined type of the cover, wherein the transmitting comprises transmitting the signal according to the selected antenna array codebook.

2. The method of claim 1, wherein the cover is a protective case for the wireless device and wherein the identification tag indicates a particular model of the protective case.

3. The method of claim 1, wherein determining the type of the cover comprises comparing the type of the cover determined based on the identification tag with a type of the cover determined using a detection technique.

4. The method of claim 3, wherein the detection technique comprises:
   transmitting another signal from the wireless device;
   receiving a plurality of signals at the wireless device based on the transmitted other signal, wherein the received plurality of signals comprises a vertical polarization component signal and a horizontal polarization component signal; and
   determining the type of the cover based on the vertical polarization component signal and the horizontal polarization component signal.

5. The method of claim 4, wherein the type of the cover is determined in the detection technique based on at least one of:
   a statistic of a cross-polarization ratio between the vertical polarization component signal and the horizontal polarization component signal; or
   a statistic of a signal-to-noise ratio based on the vertical polarization component signal and the horizontal polarization component signal.

6. The method of claim 1, wherein the identification tag indicates one or more properties of the cover.

7. The method of claim 1, wherein a transmission power of the signal is based on the determined type of the cover and on radio frequency (RF) exposure limits.

8. The method of claim 1, wherein the identification tag indicates a material of the cover.

9. An apparatus for wireless communications, comprising:
   a receiver configured to wirelessly read an identification tag associated with a cover covering at least a portion of the apparatus;
   a processing system configured to:
      determine a type of the cover based on the identification tag associated with the cover; and
      determine a transmission power based on the determined type of the cover; and
   a transmitter configured to transmit a signal from the apparatus using the determined transmission power; and
   an antenna array coupled to the transmitter, wherein the transmitter is configured to transmit the signal from the apparatus via the antenna array using the determined transmission power and wherein the signal comprises a beamformed signal or a millimeter wave signal.

10. The apparatus of claim 9, wherein the cover is a protective case for the apparatus and wherein the identification tag indicates a particular model of the protective case.

11. The apparatus of claim 9, wherein:
    the processing system is further configured to select an antenna array codebook, from a plurality of predefined antenna array codebooks, based on the determined type of the cover; and
    the transmitter is configured to transmit the signal via the antenna array according to the selected antenna array codebook.

12. The apparatus of claim 9, wherein to determine the type of the cover, the processing system is configured to compare the type of the cover determined based on the identification tag with a type of the cover determined using a detection technique.

13. The apparatus of claim 12, wherein to perform the detection technique:
    the transmitter is further configured to transmit another signal from the apparatus;
    the receiver is further configured to receive a plurality of signals based on the transmitted other signal, wherein the received plurality of signals comprises a vertical polarization component signal and a horizontal polarization component signal; and
    the processing system is further configured to determine the type of the cover in the detection technique based on the vertical polarization component signal and the horizontal polarization component signal.

14. The apparatus of claim 13, wherein the processing system is configured to determine the type of the cover in the detection technique based on at least one of:
   a statistic of a cross-polarization ratio between the vertical polarization component signal and the horizontal polarization component signal; or
   a statistic of a signal-to-noise ratio based on the vertical polarization component signal and the horizontal polarization component signal.

15. The apparatus of claim 9, wherein the identification tag indicates one or more properties of the cover.

16. The apparatus of claim 9, wherein the identification tag indicates a material of the cover.

17. The apparatus of claim 9, wherein the processing system is configured to determine the transmission power based on the determined type of the cover and on radio frequency (RF) exposure limits.

18. An apparatus for wireless communications, comprising:
   a receiver configured to wirelessly read an identification tag associated with a cover covering at least a portion of the apparatus;
   a processing system configured to determine a type of the cover based on the identification tag associated with the cover;
   a transmitter configured to transmit a signal from the apparatus; and
   an antenna array coupled to the transmitter, wherein:
      the processing system is further configured to select an antenna array codebook, from a plurality of pre-defined antenna array codebooks, based on the determined type of the cover; and
      the transmitter is configured to transmit the signal via the antenna array according to the selected antenna array codebook.

19. The apparatus of claim 18, wherein to determine the type of the cover, the processing system is configured to compare the type of the cover determined based on the identification tag with a type of the cover determined using a detection technique.

20. The apparatus of claim 18, wherein the identification tag indicates one or more properties of the cover, or wherein the identification tag indicates a material of the cover.

* * * * *